(12) United States Patent
Kobayashi et al.

(10) Patent No.: US 6,965,497 B2
(45) Date of Patent: Nov. 15, 2005

(54) INFORMATION RECORDING MEDIUM CARTRIDGE

(75) Inventors: Daiki Kobayashi, Miyagi (JP); Hideyo Ishikawa, Kanagawa (JP); Hiroshige Takakuwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 333 days.

(21) Appl. No.: 10/332,589

(22) PCT Filed: Apr. 19, 2002

(86) PCT No.: PCT/JP02/03897
§ 371 (c)(1),
(2), (4) Date: Jan. 9, 2003

(87) PCT Pub. No.: WO02/093576
PCT Pub. Date: Nov. 21, 2002

(65) Prior Publication Data
US 2003/0142443 A1 Jul. 31, 2003

(30) Foreign Application Priority Data

| May 11, 2001 | (JP) | ........................ 2001-140980 |
| May 31, 2001 | (JP) | ........................ 2001-164235 |
| Jun. 5, 2001 | (JP) | ........................ 2001-169505 |
| Sep. 19, 2001 | (JP) | ........................ 2001-284823 |
| Sep. 19, 2001 | (JP) | ........................ 2001-284824 |

(51) Int. Cl.[7] ............................................. G11B 23/03
(52) U.S. Cl. .............................. 360/133; 720/739
(58) Field of Search .............................. 720/738, 739; 360/133

(56) References Cited
U.S. PATENT DOCUMENTS 4,579,225 A * 4/1986 Kato .......................... 720/739
4,853,925 A * 8/1989 Kaneuchi .................... 720/739
5,034,844 A * 7/1991 Shiba et al. ................ 360/133
5,488,605 A * 1/1996 Ishimatsu ................... 720/739
5,786,969 A * 7/1998 Fukushima et al. ......... 360/133
5,963,537 A * 10/1999 Fujisawa .................... 720/744
5,963,538 A * 10/1999 Koshiyouji ................. 720/743
6,307,711 B1 * 10/2001 Higuchi et al. ............. 360/133

FOREIGN PATENT DOCUMENTS

| JP | 3-115971 | 12/1991 |
| JP | 4-34784 | 2/1992 |
| JP | 4-49373 | 4/1992 |
| JP | 6-251534 | 9/1994 |
| JP | 9-251752 | 9/1997 |

* cited by examiner

Primary Examiner—Brian E. Miller
(74) Attorney, Agent, or Firm—Frommer Lawrence & Haug LLP; William S. Frommer; Thomas F. Presson

(57) ABSTRACT

An information recording medium cartridge is provided with a disc, a cartridge casing having the disc accommodated therein, first and second shutters movably mounted to the cartridge casing for opening and closing recording and/or reproducing openings arranged in right and reverse sides thereof. First and second slide members having the first and second shutters are mounted on the shutters. First and second shutter plates are provided with a shutter main body that overlaps the right side or the reverse side of the cartridge casing to open and close the opening and a slide-member mounting portion for mounting the first and second slide portions to the shutter main body at an end. The slide-member mounting portion is provided with an engaging claw, wherein when mounting the first and second slide portions, the engaging claw is engaged with a claw engagement provided to the slide portion.

14 Claims, 29 Drawing Sheets

Related Art

Related Art

Related Art

INFORMATION RECORDING MEDIUM CARTRIDGE

TECHNICAL FIELD

The present invention relates to an information recording medium cartridge which stores an information recording medium such as magnetic disc, optical disc, magneto-optical disc, phase-change type optical disc or the like.

BACKGROUND ART

It is known an information recording medium cartridge as shown, for example, in FIG. 42.

The information recording medium cartridge (refer hereafter to as "cartridge" simply) 101 is provided with an information recording medium (refer hereafter to as "disc") 102, such as optical disc, magneto-optical disc or the like, having recording layers arranged on right and reverse sides, a cartridge casing (refer hereafter to as "shell") 103 which rotatably stores the disc 102, and a shutter 105 slidably mounted to the shell 103 for opening and closing recording and/or reproducing openings (refer hereafter to as "openings" simply) arranged in right and reverse sides of the shell 103.

The shutter 105 is provided with a first shutter plate 106 which opens and closes an opening 104 on the right side of the shell 103 and a second shutter plate 107 which opens and closes the opening 104 on the reverse side of the shell 103. The shutter 105 is formed roughly like an U shape by bending a metal plate to simultaneously open and close the openings 104 on the right and reverse sides of the shell 103.

When loading the cartridge 101 into a recording and/or reproducing device (refer hereafter to as "drive unit"), the shutter 105 is driven and operated by a shutter operating member mounted to the drive unit to simultaneously open the openings 104 on the right and reverse sides of the shell 103.

With the cartridge 101, as shown in FIG. 43, the disc 102 is chucked on a turntable 301 of the drive unit through the opening 104 on the reverse side of the shell 103 for rotation and driving, and recording and/or reproducing of the disc 102 is carried out by an optical pickup 302 through the opening 104 on the reverse side.

With the conventional disc 101 using the shutter 105 having first and second shutter plates 106, 107 integrally formed, when opening the opening 104 on the reverse side of the shell 103 for recording and/or reproducing, the opening 104 on the reverse side of the shell 103 is also opened even when there is no direct relation directly with recording and/or reproducing, raising an inconvenience that dust 303 or the like entering the shell 103 through the opening 104 on the right side adheres and deposits on the top surface of the disc 102. Adhesion of the dust or the like has a considerable adverse influence on a high-density large-capacity disc.

In order to solve the above inconvenience, a cartridge 201 using a divided shutter as shown in FIGS. 44–45 has been developed. In the cartridge 201, a shutter 205 comprises a first shutter plate 206 which opens and closes an opening 204 on the right side of a shell 203 and a second shutter plate 207 which opens and closes an opening 204 on the reverse side of the shell 203. The first and second shutter plates 206, 207 are moved individually to open and close the openings 204 independently.

The first and second shutter plates 206, 207 are provided with a closing portion 208 which closes the opening 204 and an open portion (recessed window) 209 continuously arranged with one side of the closing portion 208 to open the opening 204.

As shown in FIG. 44, when the first and second shutter plates 206, 207 are in a first position, the closing portions 208 of the first and second shutter plates 206, 207 are in the overlapped state to close the openings 204 arranged in right and reverse sides of the shell 203. And when being moved to a second position as shown in FIG. 45, the open portion (recessed window) 209 and the openings 204 are overlapped one another, opening the openings 204.

As shown in FIG. 44, the first and second shutter plates 206, 207 are mounted to a slide member 210. The slide member 210 is divided into a first slide portion 211 to which the first shutter plate 206 is mounted and a second slide portion 212 to which the second shutter plate 207 is mounted. The first and second slide portions 211, 212 are formed by vertically dividing the slide member 210 into two parts in the moving direction.

When loading the cartridge 201 using the divided shutter into the conventional drive unit (second drive unit) for a divided-shutter type cartridge, one of the first and second shutter plates 206, 207 is driven and operated by a shutter opening member 404 mounted to the drive unit 203 as shown in FIGS. 44–45 to open only the opening 204 on the reverse side of the shell 203. And as shown in FIG. 46, through the opening 204 on the reverse side of the shell 203, the disc 202 is chucked on a turntable 401 of the drive unit for rotation and driving, and recording and/or reproducing of the disc 202 is carried out by an optical pickup 402. On the other hand, the first shutter plate 206 closes the opening 204 on the right side of the shell 203 to prevent an intrusion of dust 303 or the like into the shell 203 through the opening 204.

The conventional cartridge 201 using divided shutter raised the following problems:

1) Since it is constructed that the first and second shutter plates 206, 207 are fixed to the first and second slide portions 211, 212 by screws 225, the mounting workability of the first and second shutter plates 206, 207 to the first and second slide portions 211, 212 is unfavorable. Moreover, when the screws 225 loosen and drop out, the first and second shutter plates 206, 207 also drop out easily from the first and second slide portions 211, 212.

2) With the conventional cartridge 201 using divided shutter as well, it is difficult to surely prevent an intrusion of dust 303 or the like into the shell 203 through the openings 204. The reason is as follows. Sure prevention of an intrusion of dust 303 or the like into the shell 203 through the openings 204 requires close contact of the first and second shutter plates 206, 207 with shutter slide faces 203a of the shell 203 in the first portion. However, when trying to slide the first and second shutter plates 206, 207 in the direction to open the openings 204 while being in close contact with the shutter slide faces 203a of the shell 203, friction produced between the first and second shutter plates 206, 207 and the shutter slide faces 203a of the shell 203 can inhibit smooth sliding of the first and second shutter plates 206, 207 or bring the shutter slide face 203a of the shell 203 to be cut by the first and second shutter plates 206, 207 to produce wearing powder, which is adhered on the disc 202, causing so-called dropouts such as skip.

3) The shutter-opening-member engagements 213 are formed by punching the first and second shutter plates 206, 207, so that when a shutter engaging pin 405 of a shutter opening member 404 of the second drive unit is engaged with the shutter-opening-member engagement 213, the shutter engaging pin 405 is cut by the edge of the shutter-opening-member engagement 213. Moreover, the inner peripheral surface of the shutter-opening-member engagement 213 is deformed by the pressure applied on the shutter through the shutter engaging pin 405.

4) When the recording and/or reproducing method of the disc 202 of the conventional divided-shutter type cartridge 201 is different from that for the disc 202 of the divided-shutter type cartridge 201 of the present invention, and when a cartridge casing of the conventional divided-shutter type cartridge 201 is formed in substantially the same size and shape as that of the divided-shutter type cartridge of the present invention, the divided-shutter type cartridge of the present invention can be inserted by mistake into the drive unit for the conventional divided-shutter type cartridge. If the divided-shutter type cartridge of the present invention is inserted by mistake into the drive unit for the conventional divided-shutter type cartridge, the disc of the divided-shutter type cartridge of the present invention can be damaged from the drive unit for the conventional divided-shutter type cartridge, because their recording and/or reproducing methods are different.

An object of the present invention is to solve the conventional problem 1), and to provide an information recording medium cartridge which allows sure and easy mounting of a shutter plate to a slide portion without using screws or the like which are needed in the prior art.

Further, another object of the present invention is to solve the conventional problem 2), and to provide a cartridge which allows smooth sliding of a divided shutter and close contact of the first and second shutter plates with the shutter slide faces of a shell in the first position (position of closing the openings).

Furthermore, still another object of the present invention is to solve the conventional problem 3), and to prevent a shutter engaging pin of a shutter opening member of a drive unit from being damaged by a shutter-opening-member engagement as well as to prevent the shutter-opening-member engagement from being subjected to the deformation or the like.

Moreover, a further object of the present invention is to solve the conventional problem 4), and to prevent a divided-shutter type cartridge of the present invention from being loaded by mistake into the drive unit for the conventional divided-shutter type cartridge which is different in the recording and/or reproducing method.

DISCLOSURE OF THE INVENTION

The invention provides an information recording medium cartridge wherein the shutter is divided into a first shutter plate for opening and closing the recording and/or reproducing opening arranged in one of the right and reverse sides of the cartridge casing and a second shutter plate for opening and closing the recording and/or reproducing opening arranged in another side of the cartridge casing, and the slide member is divided into a first slide portion to which the first shutter plate is mounted and a second slide portion to which the second shutter plate is mounted, wherein the first and second shutter plates are provided with a shutter main body which overlaps the right side or the reverse side of the cartridge casing to open and close the opening and a slide-member mounting portion for mounting the first and second slide portions to the shutter main body at an end, and the slide-member mounting portion is provided with an engaging claw, wherein when mounting the first and second slide portions, the engaging claw is engaged with a claw engagement provided to the slide portion, by which when inserting the first and second slide portions into the slide-member mounting portion of the first and second shutter plates, the engaging claw provided to the slide-member mounting portion is engaged with the claw engagement so as to integrally couple the first and second shutter plates to the first and second slide portions.

The invention provides the information recording medium cartridge as above, wherein the slide-member mounting portion is provided with a first bend continuously arranged at the end of the shutter main body substantially at right angles, a second bend continuously arranged at a front end of the first bend substantially at right angles in a direction to overlap the shutter main body, and a third bend continuously arranged at a front end of the second bend substantially at right angles toward the shutter main body, wherein when inserting the first and second slide portions between the shutter main body and the second bend to have front-end faces of the slide portions abutting on an inner surface of the first bend, the engaging claw is engaged with the claw engagement provided to the slide portion, by which when inserting the slide portions between the shutter main body and the second bend, the engaging claw is engaged with the claw engagement provided to the slide portion so as to integrally couple the shutter plate to the slide portion.

The invention provides the information recording medium cartridge as above, wherein the slide portion is provided with an inclined face, wherein when inserting into the slide-member mounting portion, the engaging claw abuts on the inclined face to bend the engaging claw and the second bend in a direction to separate from the shutter main body, so that when inserting the slide portion into the slide-member mounting portion, the engaging claw abuts on the inclined face to bend the engaging claw and the second bend in the direction to separate from the shutter main body, i.e. to move the engaging claw and the second bend in an escape way, allowing easy insertion of the slide portion into the slide-member mounting portion.

The invention provides an information recording medium cartridge provide with a disc-like information recording medium, a cartridge casing having the information recording medium accommodated therein, a shutter which opens and closes recording and/or reproducing openings arranged in right and reverse sides of the cartridge casing, a slide member having the shutter mounted thereto, and a guide mechanism which slidably mount the slide member to the cartridge casing so as to slide the shutter between a first position for closing the openings and a second position for opening the openings, wherein the guide mechanism is provided with a shutter contact and separation operating part, wherein during sliding from the first position to the second position, the shutter contact and separation operating part moves the shutter in a direction of separation with respect to a shutter slide face of the cartridge casing, by which in the first position, the shutter is made to come close contact with the shutter slide face of the cartridge casing so as to close the openings, whereas when sliding the shutter from the first position to the second position, the shutter is made to separate from the shutter slide face of the cartridge so as to allow smooth sliding.

The invention provides the information recording medium cartridge as above, wherein the guide mechanism comprises a cartridge-casing-side guide provided to the cartridge casing and a slide-member-side guide provided to the slide member, wherein the cartridge-casing-side guide comprises a pair of convex guide portions provided in facing portions on an inner surface of a slide-member assembling portion of the cartridge casing, and wherein the slide-member-side guide comprises a pair of concave guide portions provided on an outer surface of a leg of the slide member assembled to the slide-member assembling portion of the cartridge casing, wherein when inserting the leg into the slide-member assembling portion of the cartridge casing, the pair of concave guide portions is engaged with the pair of convex guide portions, so that a simple structure of the guide mechanism can be achieved, leading to easy assembling The invention provide the information recording medium cartridge as above, wherein the guide mechanism comprises a cartridge-casing-side guide provided to the cartridge casing and a slide-member-side guide provided to the slide member, wherein the cartridge-casing-side guide comprises a pair of first and second convex guide portions provided in facing portions on an inner surface of a slide-member assembling portion of the cartridge casing and a pair of third and fourth concave guide portions arranged adjacent to the pair of first and second convex guide portions, and wherein the slide-member-side guide comprises a pair of fifth and sixth concave guide portions provided on an outer surface of a leg of the slide member assembled to the slide-member assembling portion of the cartridge casing wherein when inserting the leg into the slide-member assembling portion of the cartridge casing the pair of fifth and sixth concave guide portions is engaged with the pair of first and second convex guide portions, and a pair of seventh and eighth convex guide portions which is engaged with the pair of fifth and sixth convex guide portions, so that the leg can be supported at two spots (two stages), leading to smooth sliding of the shutter.

The invention provides the information recording medium cartridge as above, wherein the leg of the slide member comprises a first leg portion provided to the slide member at an end in a slide direction thereof and a second leg portion provided to the slide member in a center or another end in the slide direction, so that a space between the first and second legs can effectively be used as an arrangement space for a spring member and the like.

The invention provides the information recording medium cartridge as above, wherein the shutter contact and separation operating part is constructed by providing on facing surfaces of the first and second convex guide portions and opposite outer surfaces of the third and fourth concave guide portions a first flat surface for supporting the slide member with the shutter contacting the shutter slide face of the cartridge casing in the first position, an inclination surface for sliding the slide member in a direction to separate the shutter from the shutter slide face of the cartridge casing during sliding from the first position to the second position, and a second flat surface for supporting the slide member with the shutter separating from the shutter slide face of the cartridge casing in the second position, so that not only a simplified structure of the shutter contact and separation operating part, but also a small arrangement space for the shutter contact and separation operating part can be obtained, achieving space saving.

The invention provides the information recording medium cartridge as above, wherein the inclination surfaces of the first and second convex guide portions and those of the third and fourth concave guide portions are formed in positions with substantially the same spacing as that between the first leg portion and the second leg portion with respect to a slide direction of the slide member, wherein they operate the first leg portion and the second leg portion simultaneously synchronously during sliding of the slide member to move the shutter while maintaining it parallel with respect to the shutter slide face of the cartridge casing, so that the first and second legs can be operated synchronously during sliding of the slide member, leading to sliding of the shell without being inclined with respect to the shutter slide face of the shell.

The invention provides an information recording medium cartridge provided with a shutter which opens and closes recording and/or reproducing openings arranged in right and reverse sides of the cartridge casing having an information recording medium accommodated therein, and a slide member which movably mounts the shutter to the cartridge casing in a direction to open and close the openings, wherein the shutter is divided into a first shutter plate for opening and closing the recording and/or reproducing opening arranged in one of the right and reverse sides of the cartridge casing and a second shutter plate for opening and closing the recording and/or reproducing opening arranged in another side of the cartridge casing, wherein the slide member is divided into a first slide portion to which the first shutter plate is mounted and a second slide portion to which the second shutter plate is mounted, wherein the first and second shutter plates are provided with a shutter-opening-member engagement with which a shutter opening member of the recording and/or reproducing device is engaged, wherein the shutter-opening-member engagement comprises a shutter-side engagement formed by recessing the slide-member mounting portion of the shutter plate and a slide-member-side engagement formed by recessing the slide portion and facing the shutter-side engagement, so that not only the first and second shutter plates can smoothly be slid with respect to the shell, but also the shutter-opening-member engagement can be prevented from undergoing deformation and the like.

The invention provides the information recording medium cartridge as above, wherein a recess of the shutter-side engagement is formed greater than a recess of the slide-member-side engagement, a recess edge of the slide-member-side engagement being exposed inside a recess edge of the shutter-side engagement (the inner peripheral face of the shutter-side engagement is disposed outside that of the slide-member-side engagement), so that the shutter engaging pin of the shutter opening member contacts the inner peripheral face of the slide-member-side engagement, and is in no-contact with the inner peripheral face of the shutter-side engagement, thus obtaining the shutter engaging pin protected from an edge and the like of the inner peripheral face of the shutter-side engagement, and the inner peripheral face of the shutter-side engagement protected from deformation due to contact pressure and the like of the shutter engaging pin.

The invention provides the information recording medium cartridge as above, wherein the first and second shutter plates overlap one another in a direction of thickness of the cartridge casing when closing the recording and/or reproducing openings arranged in the right and reverse sides of the cartridge casing, and the shutter-opening-member engagements also overlap one another in a center of the cartridge casing, so that when the first and second shutter plates close the recording and/or reproducing openings arranged in the right and reverse sides of the cartridge casing, the shutter-side engagement and the slide-member-side engagement overlap one another in the direction of thickness of the cartridge casing, thus facilitating assembling and positioning and the like between the two. Moreover, the shutter-opening-member engagement is arranged in the center of the cartridge casing and/or in the center of the shutter in the cross direction, so that when inserted into the conventional drive unit having conventional shutter-opening-member engagement arranged in the position displaced from the center of the cartridge casing and/or the center of the shutter in the cross direction, the positions of the shutter-opening-member engagement and the shutter opening member do not coincide with each other, therefore, the shutter is not opened, preventing miss-loading into the conventional drive unit.

The invention provides the information recording medium cartridge as above, wherein at least one of the recesses of the slide-member-side engagements which constitute the shutter-opening-member engagements of the first and second shutter plates has a bottom, wherein when overlapping in the center of the cartridge casing, the shutter-opening-member engagements of the first and second shutter plates are separated by the bottom, so that it can be prevented that the shutter opening member of the drive unit is engaged with both of the slide-member-side engagements of the first and second shutter plates.

The invention provides an information recording medium cartridge provided with a shutter which opens and closes recording and/or reproducing openings arranged in right and reverse sides of the cartridge casing having an information recording medium accommodated therein, and a slide member which movably mounts the shutter to the cartridge casing in a direction to open and close the openings, wherein the shutter is divided into a first shutter plate for opening and closing the recording and/or reproducing opening arranged in one of the right and reverse sides of the cartridge casing and a second shutter plate for opening and closing the recording and/or reproducing opening arranged in another side of the cartridge casing, wherein the slide member is divided into a first slide portion to which the first shutter plate is mounted and a second slide portion to which the second shutter plate is mounted, and wherein the first and second shutter plates are slid independently by the first and second slide portions, wherein the information recording medium cartridge is provided with shutter-opening-member engagements, wherein when inserted into a drive unit for that cartridge, a shutter opening member provided to the drive unit is engaged with the shutter-opening-member engagement which is pressed by the shutter opening member to slide the first and second shutter plates in a direction to open the openings, and miss-insertion stops, wherein when inserted into a drive unit for a divided-shutter type cartridge which is different in the recording and/or reproducing method, the shutter opening member provided to the drive unit is engaged with the miss-insertion stop to stop further insertion of the cartridge by the shutter opening member, so that when inserting the information recording medium cartridge into the drive unit for that cartridge, the shutter opening member provided to the drive unit is engaged with the shutter-opening-member engagement to slide the shutter so as to open the openings, whereas when inserting the information recording medium cartridge into the drive unit for divided-shutter type cartridge which is different in the recording and/or reproducing method, the shutter opening member provided to the drive unit is engaged to stop further insertion of the cartridge.

The invention provides the information recording medium cartridge as above, wherein the shutter-opening-member engagements are arranged in a center of the first and second slide portions, by which a single shutter opening member provided to the drive unit allows the first and second shutter plates to be moved in the opening and closing direction.

The invention provides the information recording medium cartridge as above, wherein the miss-insertion stops are arranged at a front end of the cartridge casing, so that the shutter opening member of the drive unit for a divided-shutter type cartridge which is different in the recording and/or reproducing method can easily and surely be engaged with the miss-insertion stops.

The invention provide the information recording medium cartridge as above, wherein the miss-insertion stops are arranged in symmetric positions of the right and reverse sides of a front end of the cartridge casing with respect to a position of the opening-member engagement when closing the shutter, so that even when inserting into the drive unit which is different in the recording and/or reproducing method the information recording medium cartridge in the normal position, or when inserting into the drive unit which is different in the recording and/or reproducing method the information recording medium cartridge with the upper side down, the shutter opening member of the drive unit is engaged to stop further insertion by the shutter opening member.

The invention provides an information recording medium cartridge provided with a shutter which opens and closes recording and/or reproducing openings arranged in right and reverse sides of the cartridge casing having an information recording medium accommodated therein, and a slide member which movably mounts the shutter to the cartridge casing in a direction to open and close the openings, wherein the shutter is divided into a first shutter plate for opening and closing the recording and/or reproducing opening arranged in one of the right and reverse sides of the cartridge casing and a second shutter plate for opening and closing the recording and/or reproducing opening arranged in another side of the cartridge casing, wherein the slide member is divided into a first slide portion to which the first shutter plate is mounted and a second slide portion to which the second shutter plate is mounted, and wherein the first and second shutter plates are provided with a shutter main body which overlaps the right side or the reverse side of the cartridge casing to open and close the opening and a slide-member mounting portion arranged at an end of the shutter main body for mounting the first and second slide portions on an inner surface thereof, wherein an end of the slide member in a slide direction protrudes from an end of the slide-member mounting portion, the protruded end being provided with a shutter-opening-member engagement with which a shutter opening member of the recording and/or reproducing device is engaged, by which not only smooth sliding of the first and second shutter plates with respect to the shell can be achieved through the first and second slide portions, but also need of formation of the shutter-opening-member engagement by punching part of the first and second shutter plates is eliminated.

The invention provides the information recording medium cartridge as above, wherein the shutter-opening-member engagement is formed out of a synthetic resin and integrally with the slide member, so that the productivity can be enhanced. Moreover, since the shutter-opening-member engagement is formed out of a synthetic resin, the shutter engaging member of the shutter opening member can be prevented from being damaged by shutter-opening-member engagement.

The invention provides the information recording medium cartridge as above, wherein the side edge of the shutter-opening-member engagement in the slide direction protruding from the end of the slide-member mounting portion of the shutter is located inside an edge of the shutter main bodies of the first and second shutter plates in the slide direction, so that the outer edge of the shutter-opening-member engagement in the slide direction is located inside the outer edge of the shutter in the slide direction, thus allowing prevention of the shutter-opening-member engagement from restricting a slide range of the shutter.

The invention provides the information recording medium cartridge as above, wherein a length of the slide member is substantially the same as a width of the shutter main body of the shutter plate, and a width of the slide-member mounting portion is smaller than the width of the shutter main body, so that the shutter-opening-member engagement can be located in a stepped portion of the width of the shutter main body and that of the slide-member mounting portion in the exposed state.

BEST MODE FOR CARRYING OUT THE INVENTION

Next, an explanation is made about an information recording medium cartridge in a first embodiment of the present invention in the order of 1) general constitution of the whole, 2) constitution of disc, 3) constitution of shell, 4) constitution of shutter, 5) constitution of slide member, 6) constitution of guide mechanism, 7) assembling of shutter to slide member, and 8) operation of information recording medium cartridge, followed by an explanation about another embodiment at 9).

1) General Constitution of the whole information recording medium cartridge

Figure 1:
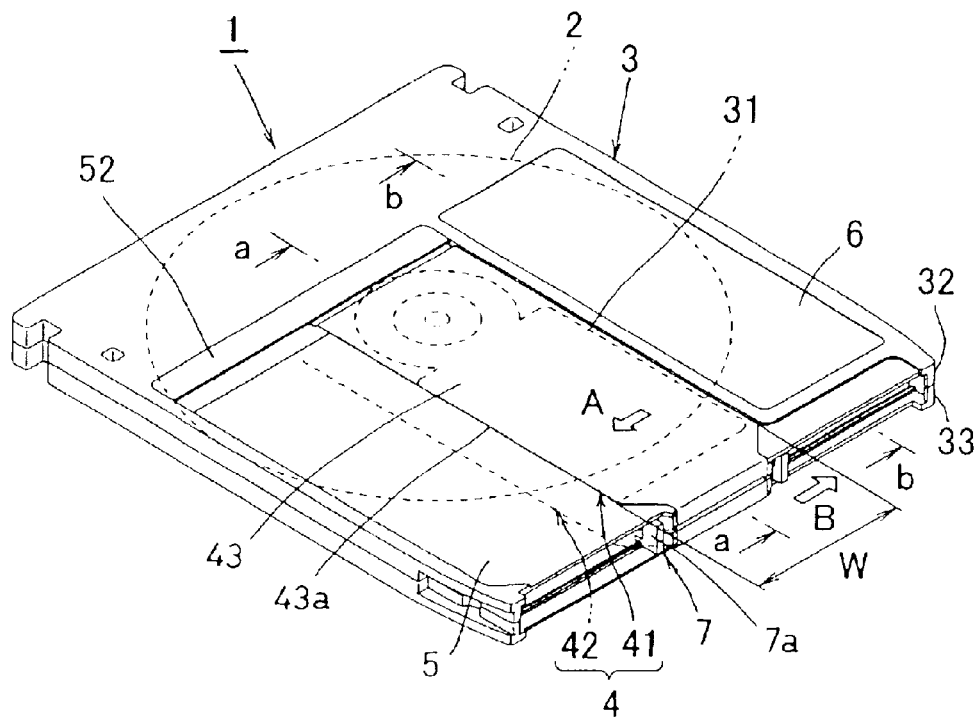
FIG. 1 is a perspective view of a cartridge seen from the right side (shutter closed condition)
Figure 2:
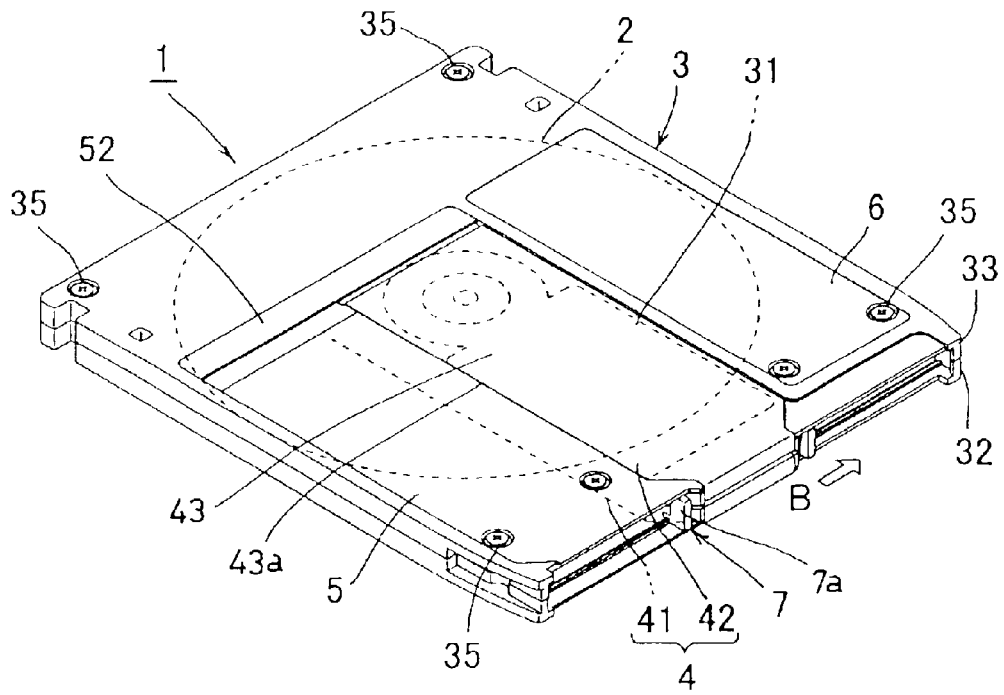
FIG. 2 is a perspective view of the cartridge seen from the reverse side (shutter closed condition)
Figure 3:
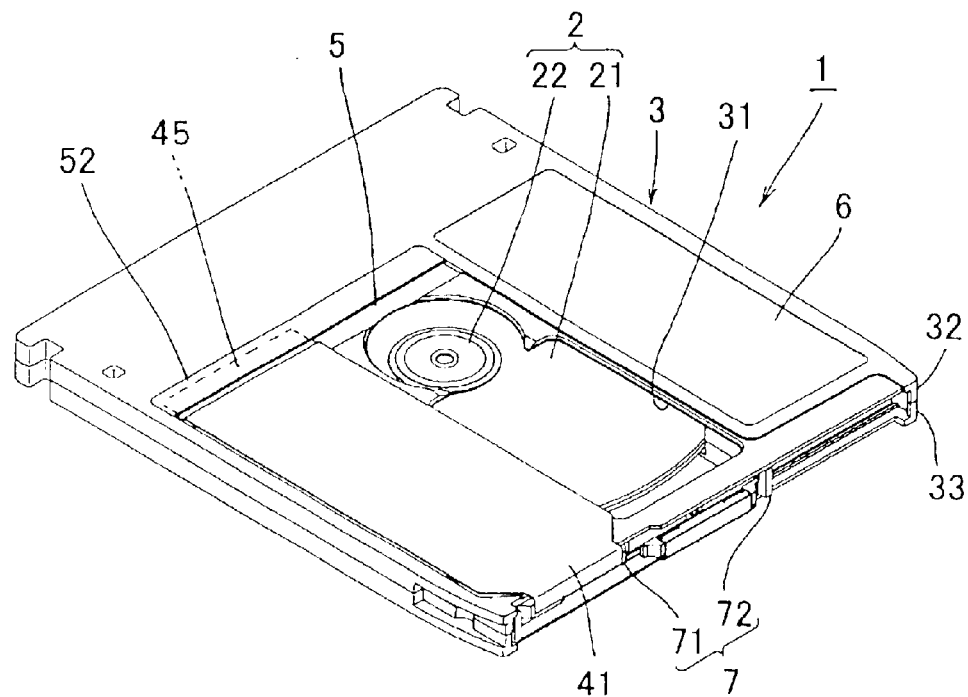
FIG. 3 is a perspective view of the cartridge seen from the right side (shutter open condition)
Figure 4:
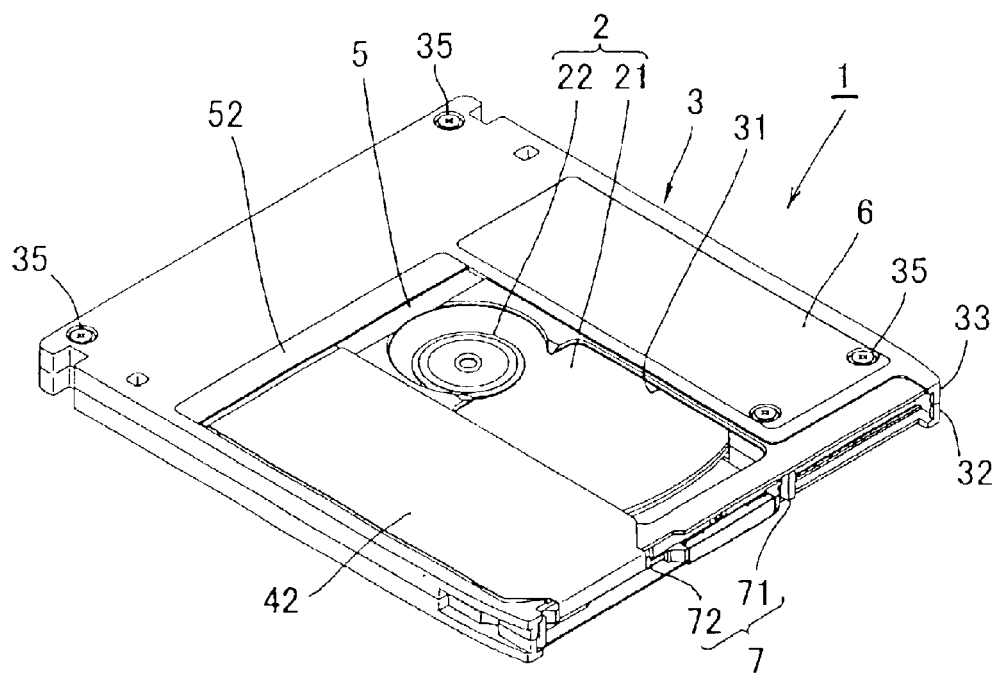
FIG. 4 is a perspective view of the cartridge seen from the reverse side (shutter open condition)

FIG. 1 is a perspective view of the information recording medium cartridge (refer hereafter to as "cartridge") in the so-called shutter closed condition, seen from the right side, FIG. 2 is a perspective view of the cartridge seen from the reverse side, FIG. 3 is a perspective view of the cartridge in the reverse-side shutter open condition, and FIG. 4 is a perspective view of the cartridge seen from the reverse side. The cartridge 1 is constructed as a so-called double-sided application cartridge which allows recording and/or reproducing on both the right and reverse sides.

The cartridge 1 is provided with a disc-like information recording medium (refer hereafter to as "disc") 2, a cartridge casing (refer hereafter to as "shell") 3 which rotatably stores the disc 2, recording and/or reproducing openings (refer hereafter to as "openings") 31 arranged in the right and reverse sides of the shell 3, a shutter 4 which opens and closes the openings 31, a slide member 7 having the shutter 4 mounted thereto, and a guide mechanism 8 (refer to FIG. 16) which slidably mounts the slide member 7 to the shell 3, which will be explained later.

The shutter 4 is provided with a first shutter plate 41 which opens and closes the opening 31 arranged in the right side (side of an upper half 32 which will be explained later) of the shell 3, and a second shutter plate 42 which opens and closes the opening 31 arranged in the reverse side (side of a lower half 33 which will be explained later) of the shell 3.

The first and second shutter plates 41, 42 are slid independently between a first position for closing the openings 31 shown in FIGS. 1 and 2 and a second position for opening the openings 31 shown in FIGS. 3 and 4, respectively.

The first and second shutter plates 41, 42 which constitute the shutter 4 are formed to have a dimension slightly larger than the openings 31 arranged in the right and reverse sides of the shell 3 and required for completely closing the openings 31, and a width (size) W so that in the first position for closing the openings 31, they substantially coincide with each other in the direction of thickness of the shell 3 to overlap one another. One and the same member is used for the first and second shutter plates 41, 42.

The first shutter plate 41 is slid from the first position for closing the opening 31 to the direction of arrow A so as to move to the second position for opening the opening 31. The second shutter plate 42 is slid from the first position for closing the opening 31 to the direction of arrow B opposite to the direction of arrow A so as to move slide to the second position for opening the opening 31.

Shutter slide faces (shutter slide area) 5 for sliding of the first and second shutter plates 41, 42 are arranged on the right and reverse sides of the shell 3 at one side portion with respect to the openings 31, and label adhesion faces (label adhesion area) 6 for an index card or the like are arranged thereon at another side portion. The first and second shutter plates 41, 42 are mounted to the slide member 7 which will be explained in detail later. The slide member 7 is slidably mounted to the shell 3 by the guide mechanism 8.

When the slide member is slid to the first position for closing the opening 31 of the shell 3 by the guide mechanism 8, the first and second shutter plates 41, 42 come close contact with the shutter slide faces 5 of the shell 3 by a shutter ascent and descent operating portion provided to the guide mechanism 8 (which will be explained in the section of the guide mechanism 8) to completely close the openings 31 of the shell 3. Moreover, when slid from the first position to the second position, the first and second shutter plates 41, 42 are separated from the shutter slide faces 5 of the shell 3 by the shutter ascent and descent operating portion for smooth sliding up to the second position.

2) Constitution of Disc

Figure 5:
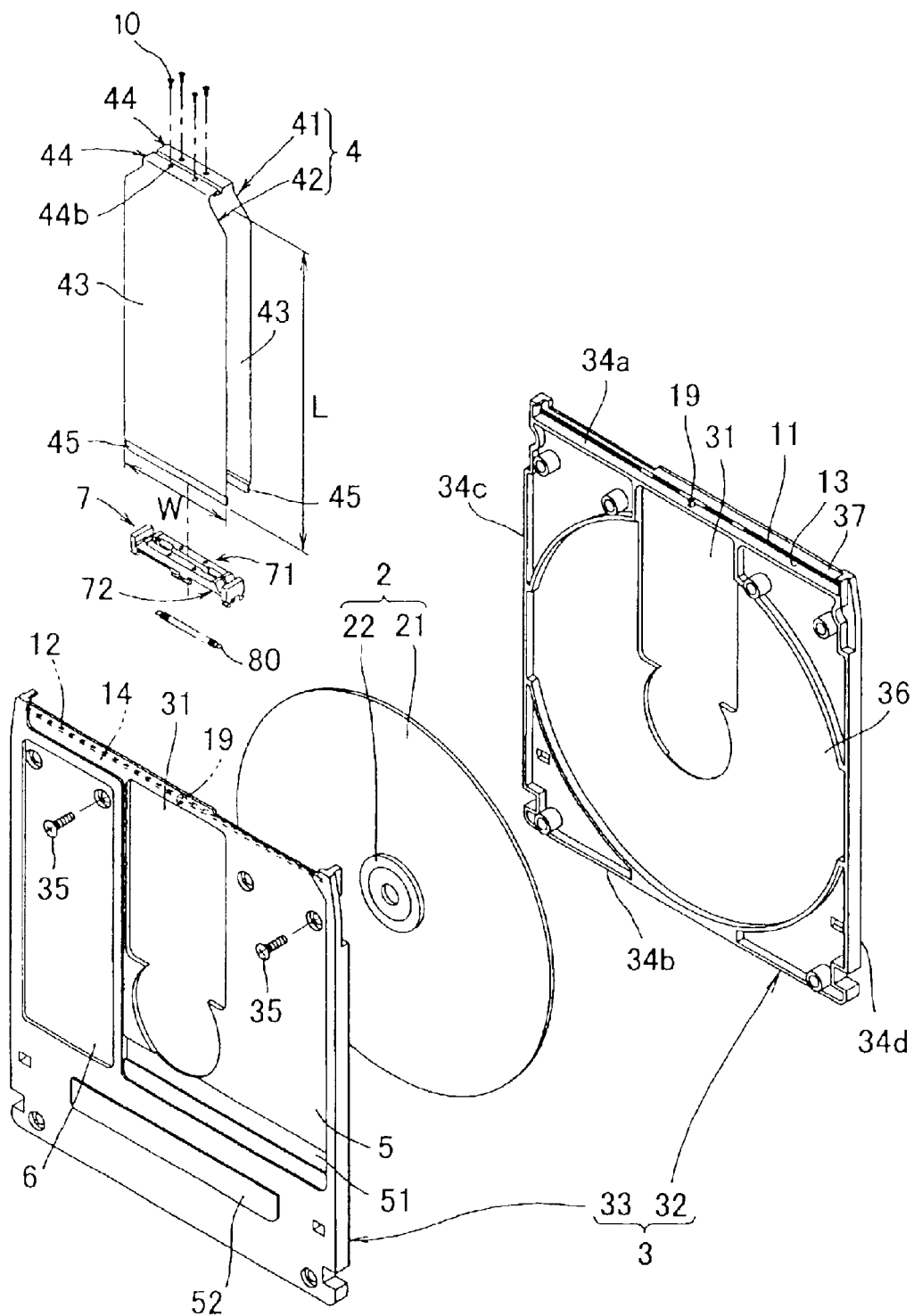
FIG. 5 is an exploded perspective view of the cartridge.

As shown in FIG. 5, the disc 2 includes a disc-like recording medium main body 21 and a center hub 22 arranged in center of the recoding medium main body 21.

Figure 6:
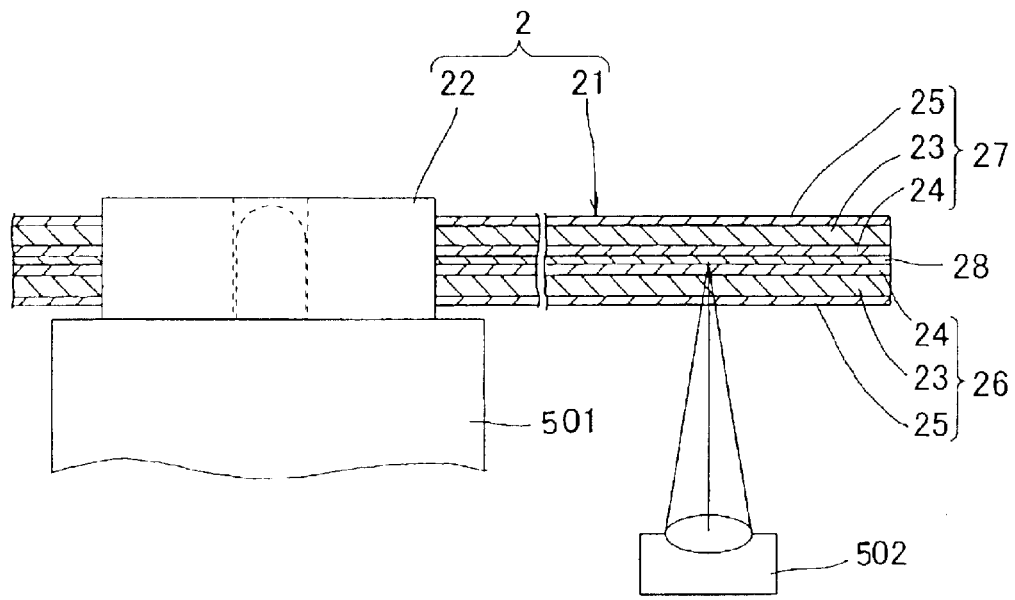
FIG. 6 is a sectional view of a disc.

As shown in FIG. 6, for example, the recording medium main body 21 is formed by arranging a recording layer 24 on the inner surface of a substrate 23 of polycarbonate (PC) and placing one upon another first and second recording media 26, 27 of film-formed substrate having a protective layer 25 on the outer surface for adhesion through an adhesive layer 28. With the disc 2, with the center hub 22 chucked on a turntable 501 of the drive unit, recording and/or reproducing of the recording layer 24 of the first recording medium 26 becomes possible by an optical pickup 502, whereas with the disc 2 turned over, recording and/or reproducing of the recording layer 24 of the second recording medium 27 becomes possible by the optical pickup 502. The recording medium main body 21 is formed with a high capacity of several GB to 40 GB (gigabyte).

The center hub 22 is constructed such that not only when carrying out recording and/or reproducing of the recording layer 24 of the first recording medium 26 of the disc 2, but also when carrying out recording and/or reproducing of the recording layer 24 of the second recording medium 27 with the disc 2 turned over for loading, the disc 2 can surely be chucked on the turntable of the drive unit.

3) Constitution of Shell

The shell 3 is formed by mutually butting the front, rear, left, and right peripheral walls 34a, 34b, 34c, 34d of the upper half 32 and the lower half 33 having the openings 31 in the center in the axial direction (shutter slide direction) for connection with a plurality of screws 35. The side where the head of the screws 35 is visible is the reverse side.

With the shell 3, the inside of the front and rear peripheral walls 34a, 34b of the upper and lower halves 32, 33 forms a disc storage 36, and the outside of the front peripheral walls 34a of the upper and lower halves 32, 33 forms a slide-member assembling portion 37.

And the right and reverse sides of the recording medium main body 21 of the disc 2 stored in the disc storage 36 and those of the center hub 22 face the openings 31 of the upper and lower halves 32, 33.

Figure 7:
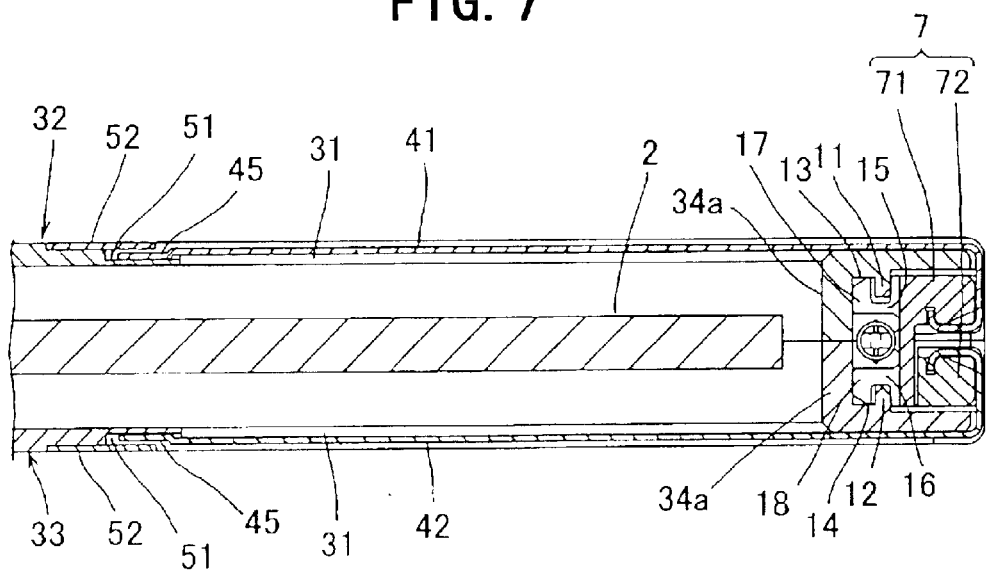
FIG. 7 is a sectional view along a—a in FIG. 1.

The shutter slide faces 5 and the label adhesion faces 6 are arranged on the outer surface of the upper and lower halves 32, 33. The shutter slide faces 5 are formed in the position lowered from the outer surface of the upper and lower halves 32, 33 roughly by the thickness of the first and second shutter plates 41, 42, wherein when placing the first and second shutter plates 41, 42 one upon another, the outer surface of the upper and lower halves 32, 33 and that of the first and second shutter plates 41, 42 are roughly located on the same plane or slightly lowered. Further, an end of the shutter slide face 5 on the side of the rear peripheral wall 34b of the upper and lower halves 32, 33 forms a shutter-end insertion 51 which is lowered further by one step. As shown in FIG. 7, ends 45 of the first and second shutter plates 41, 42 are inserted into the shutter-end insertion 51, and are prevented from being separated (rolled up) from the outer surface of the upper and lower halves 32, 33 by a slide guide plate 52 mounted inside the shutter-end insertion 51, achieving insured smooth sliding of the first and second shutter plates 32, 33.

Figure 8:
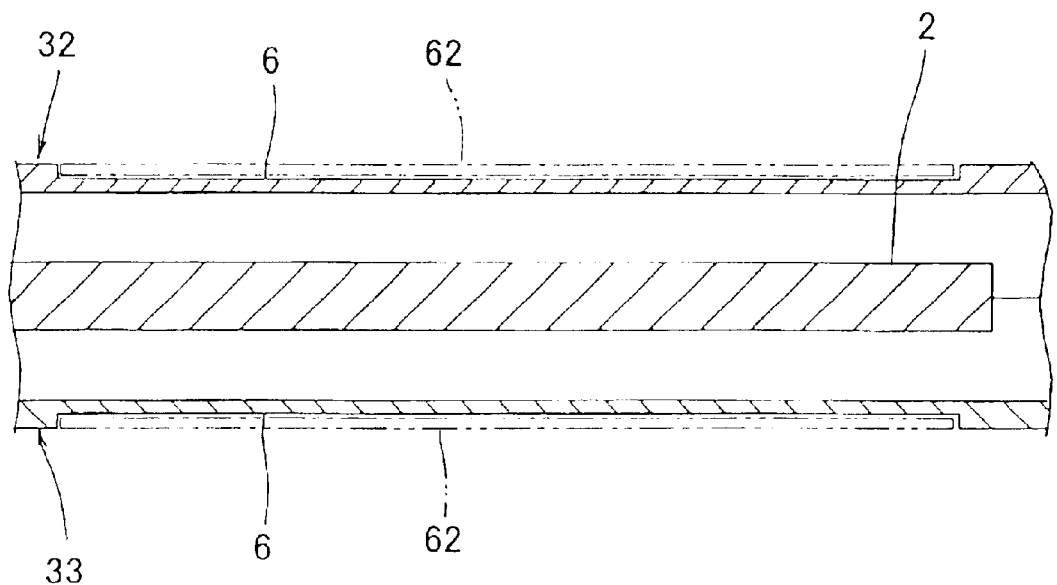
FIG. 8 is a sectional view along b—b in FIG. 1.

The shutter adhesion faces 6 are formed in the position lowered from the outer surface of the upper and lower halves 32, 33 roughly by the thickness of the adhesive label, wherein when adhering the adhesive label 62 shown in two-dot chain line on the seat adhesion faces 6 as shown in FIG. 8, the outer surface of the upper and lower halves 32, 33 and that of the adhesive label 62 are roughly on the same plane or slightly lowered.

The shell 3 is formed out of synthetic resin having excellent formability and mechanical strength, such as polycarbonate (PC), ABS resin or the like.

Figure 9:
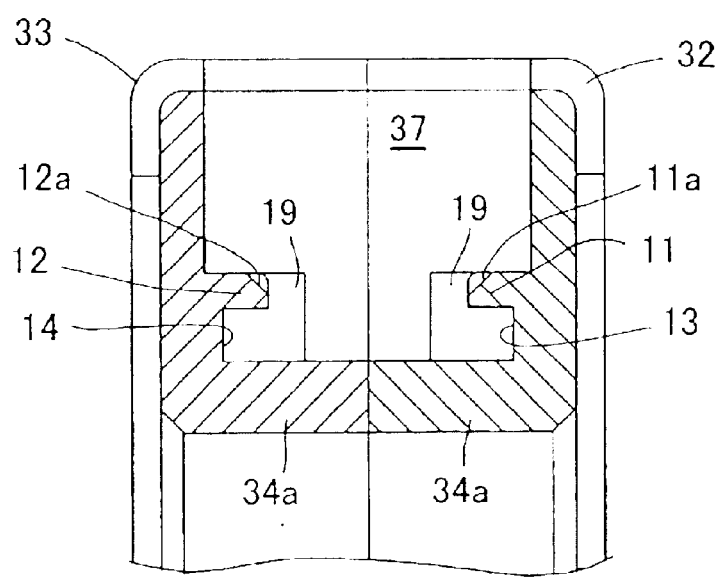
FIG. 9 is a sectional view of a front peripheral wall side of a shell.

As shown in FIGS. 5 and 9, a pair of first and second convex guides 11, 12 constituting the guide mechanism 8 which will be explained later is arranged in the facing portions of the inner surface of the slide-member assembling portion 37 of the upper and lower halves 32, 33 is, and a pair of third and forth concave guides 13, 14 is arranged in the facing portions of the lower part of the pair of first and second convex portions 11, 12.

Arranged on the top face of the first and second guides 11, 12 of the guide mechanism 8 are so-called chamfered inclined faces 11a, 12a for facilitating insertion of first and second legs of the slide member 7. Moreover, a positioning projection 19 is arranged in the center of the first and second guides 11, 12 in the longitudinal direction (slide-member slide direction) to set the slide member 7 and the shutter 4 mounted thereto in the first position for closing the openings 31.

4) Constitution of Shutter

Figure 10:
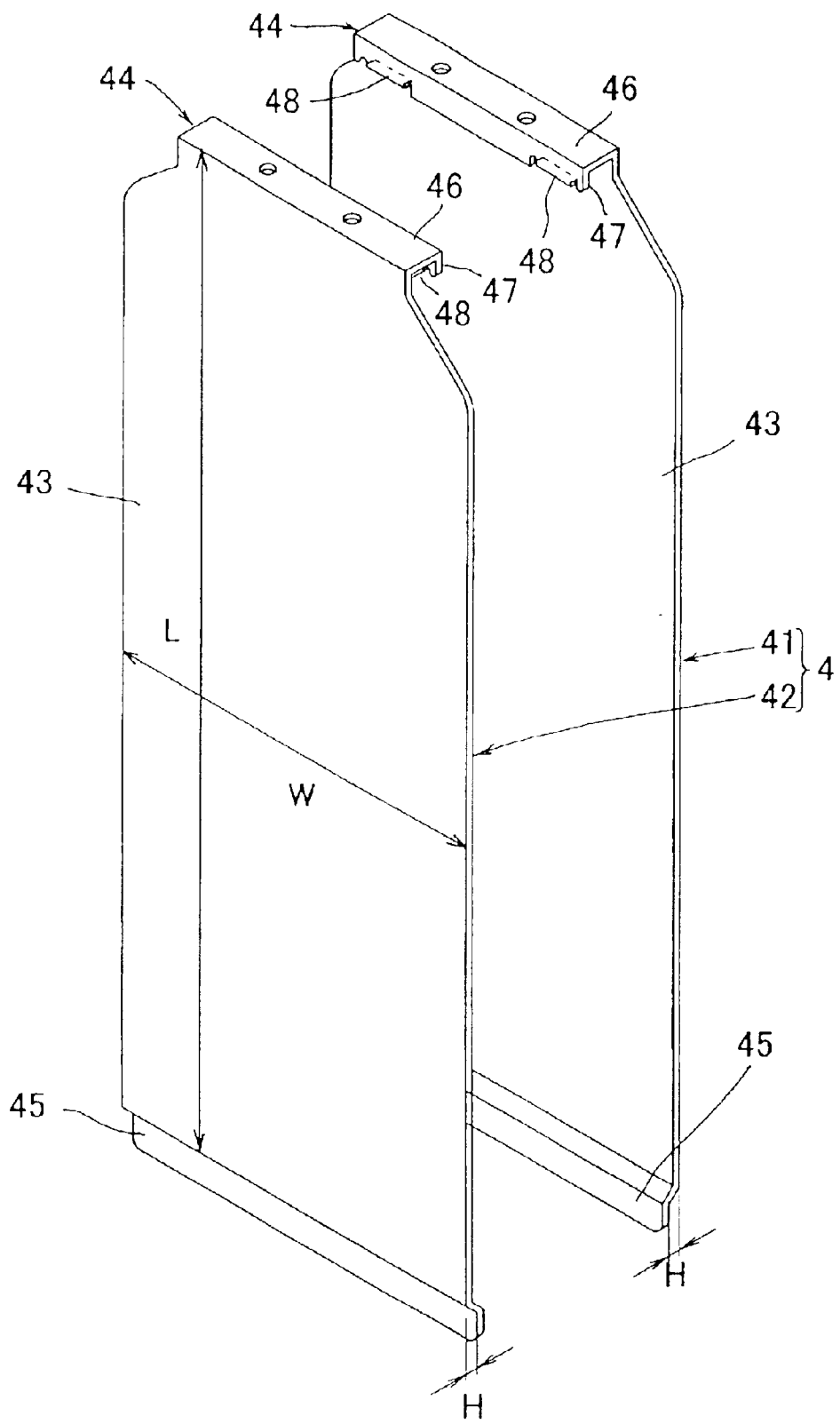
FIG. 10 is a perspective view of first and second shutter plates.

As shown in FIGS. 5 and 10, the shutter 4 is divided into the first shutter plate 41 which opens and closes the opening 31 of the upper half 32 and the second shutter plate 42 which opens and closes the opening 31 of the lower half 33.

The first and second shutter plates 41, 42 are provided with a shutter main body 43 formed like a rectangle with width W and length L which are slightly larger than those of the opening 31 to allow complete closing thereof, a slide-member mounting portion 44 arranged at one end of the shutter main body 43 in the longitudinal direction, and an inserted-side end 45 arranged at another end of the shutter main body 43 in the longitudinal direction and inserted into the shutter-end insertion 51 at one end of the shutter slide faces 5 of the upper and lower halves 32, 33.

As shown in FIG. 10, the slide-member mounting portion 44 is provided with a first bend 46 continuously arranged at an end of the shutter main body 43 substantially at right angles and being narrower than the shutter main body 43, a second bend 47 continuously arranged at a front end of the first bend 43 substantially at right angles in the direction to overlap the shutter main body 43, and a third bend (refer hereafter to as "engaging claw") 48 continuously arranged at both end portions of a front end of the second bend 47 substantially at right angles toward the shutter main body 43.

The inserted-side end 45 is formed having a step H with respect to the shutter main body 43 for insertion into the shutter-end insertion 51 below the slide guide plate 52.

The first and second shutter plates 41, 42 are formed by bending a plate of metal such as stainless steel, aluminum or the like punched in a predetermined shape or out of synthetic resin and the like. In this embodiment, the same member is used for the first and second shutter plates 41, 42, but different members may be used intentionally.

5) Constitution of Slide Shutter

Figure 11:
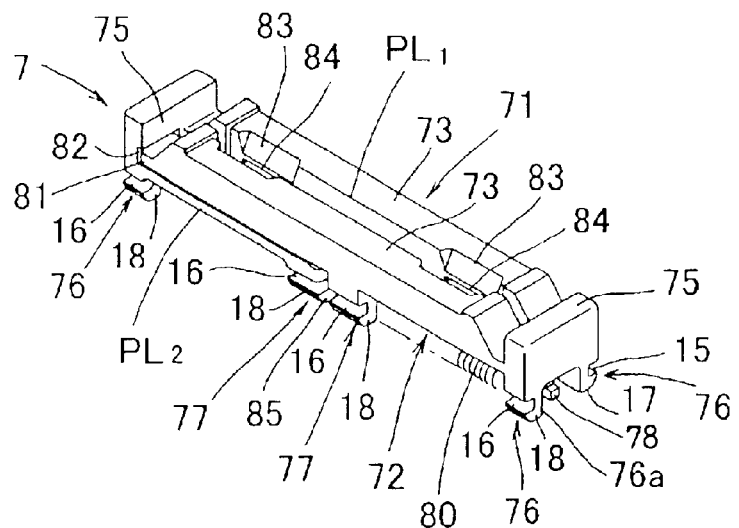
FIG. 11 is a perspective view of a slide member.
Figure 12:
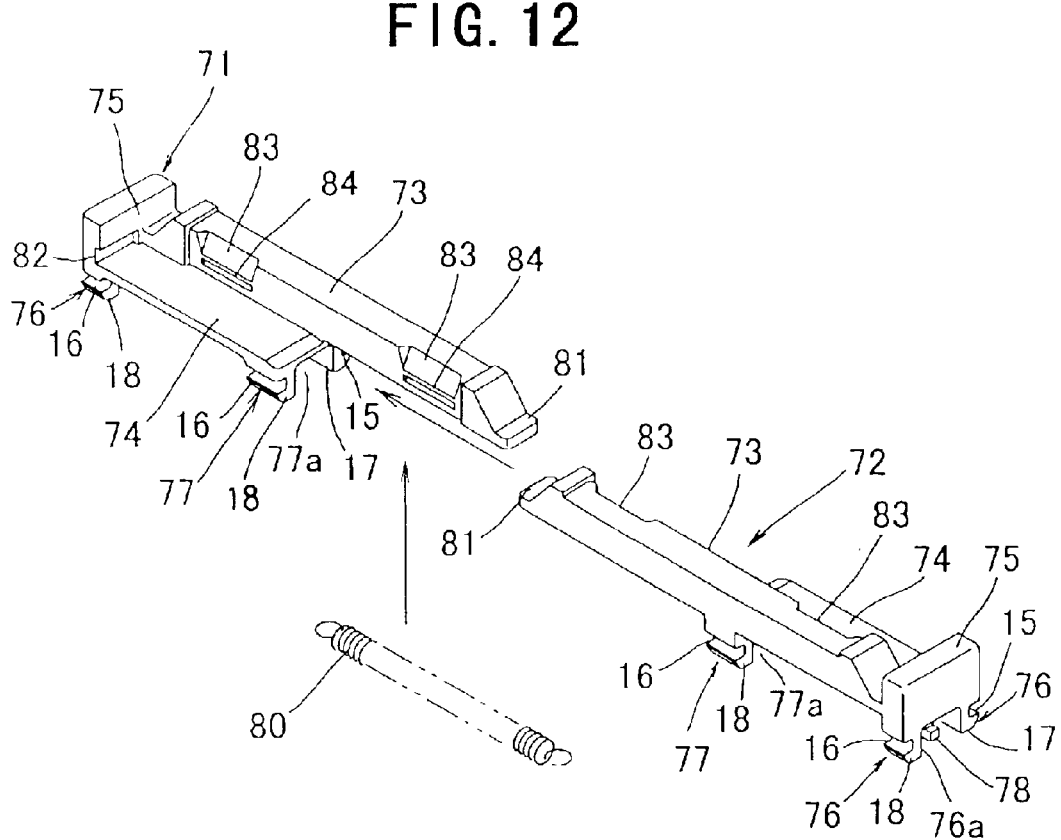
FIG. 12 is an exploded perspective view of the slide member.

As shown in FIGS. 11 and 12, by a parting line $PL_1$ in the slide direction (longitudinal direction), a parting line $PL_2$ in the thickness direction and the like, the slide member 7 is divided into a first slide portion 71 for slidably mounting the first shutter plate 41 to the shell 3 and a second slide portion 72 for slidably mounting the second shutter plate 42 to the shell 3.

The first and second slide portions 71, 72 are provided with a shutter-plate mounting portion 73 for mounting one of the first shutter plate 41 and the second shutter plate 42, a stage 74 formed at one side of the bottom of the shutter-plate mounting portion 73 and having roughly the same width as that of the shutter-plate mounting portion 73 and roughly half the length thereof and on which the shutter mounting potion of another slide member is disposed, a shutter-opening-member engagement 75 arranged on an upper face of the shutter-plate mounting portion 73 at an end in the slide direction and with which a shutter opening member (not shown) of the drive unit is engaged, a first leg 76 arranged on a lower face of the shutter-plate mounting portion 73 at the end in the slide direction (the shutter-opening-member engagement 75), a second leg 77 arranged on a lower face of the shutter-plate mounting portion 73 in the center thereof, and a spring catch 78 arranged between the first legs 76, 76 of the first and second slide portions 71, 72.

The first leg 76 is divided into the left and right leg portions by a center recess 76a. In the similar way to the first leg 76, the second leg 77 is also divided into the left and right leg portions by a center recess 77a.

The first and second slide portions 71, 72 are formed having the same shape and size and for disposing the shutter-plate mounting portion 73 of the first slide portion 71 on the stage 74 of the second slide portion 72 as well as disposing the shutter-plate mounting portion 73 of the second slide portion 72 on the stage 74 of the first slide portion 71. One and another ends of a spring member (coil spring) 80 are caught by a spring catch 78 provided to the first and second slide portions 71, 72, respectively.

The first and second slide portions 71, 72 are pulled to each other by the spring member 80 so that a front end of the shutter-plate mounting portion 73 of the first slide portion 71 abuts on the shutter-opening-member engagement 75 of the second slide portion 72, and a front end of the shutter-plate mounting portion 73 of the second slide portion 72 abuts on the shutter-opening-member engagement 75 of the first slide portion 71. Thus, the first and second slide portions 71, 72 are coupled to each other as shown in FIG. 11.

A convex 81 and a concave 82 fitted to each other are arranged at an abutment between the front end of the shutter-plate mounting portion 73 and the shutter-opening-member engagement 75. Fitting of these convex 81 and concave 82 prevents positional displacement (separation) of the first and second slide portions 71, 72 in the coupled state.

So-called chamfered inclined faces 83 are arranged at both ends of the inner surface of the first and second shutter-plate mounting portions 73, and a claw engagement 84 is arranged at the lower end of the inclined face 83. An accommodation space for the spring member 80 is defined between the first and second legs 76, 77.

Figure 13:
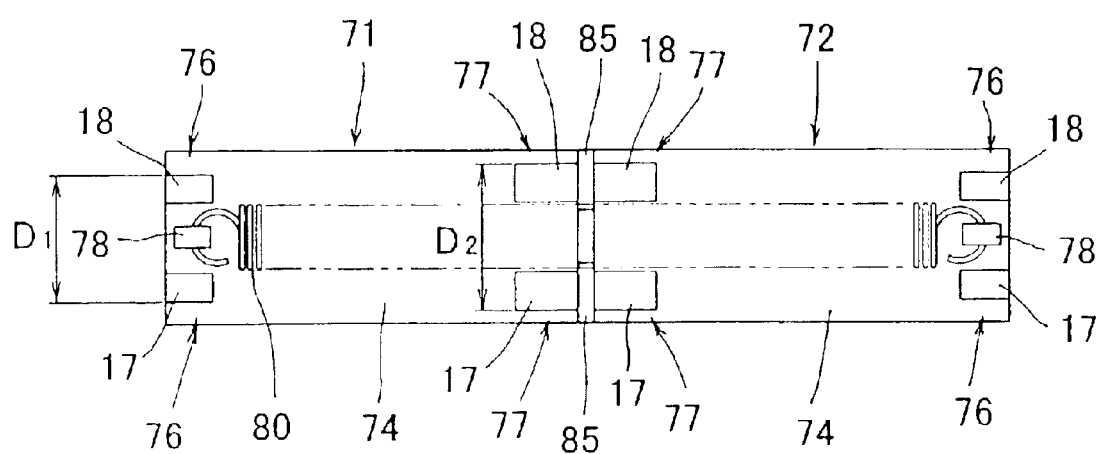
FIG. 13 is a bottom view of the slide member.

As shown in FIGS. 12 and 13, the spring catch 78 is formed inside the outer surface of the first leg 76 to allow mounting of the spring member 80 in the state to be placed within the lower face of the first and second shutter-plate mounting portions 73.

As shown in FIG. 13, a clearance 85 is arranged between the second legs 77, 77 in the center of the bottom of the first and second slide portions 71, 72 coupled by the spring member 80, into which the positioning projection 19 arranged in the center of the first and second guides 11, 12 is inserted.

Integrally formed with the first and second slide portions 71, 72 out of synthetic resin such as polycarbonate, polyacetal, polypropylene or the like are the shutter-plate mounting portion 73, the stage 74, the shutter-opening-member engagement 75, the first and second legs 76, 77 and the like for smooth sliding along the first to fourth guides 11–14. The first and second slide portions 71, 72 have the same shape and size, and thus can be constructed as the same member or color-coded for assembling. Arranged on the outer surface of the left and right leg portions of the first and second legs 76, 77 are the fifth to eighth guides 15–18 which are respectively engaged with the first and second guides 11, 12 and the third and fourth guides 13, 14 arranged in the facing portion of the inner surface of the slide-member assembling portion 37 of the shell 3 to constitute together with these first to fourth guides 11–14 the guide mechanism 8.

As shown in FIGS. 1 and 2, an outer side edge 75a of the shutter-opening-member engagement 75 in the slide direction is placed inside an outer side edge 43a of the shutter main body 43 of the first and second shutter plates 41, 42 in the slide direction.

6) Constitution of Guide Mechanism

As is described above, the guide mechanism 8 serves to slide the first and second shutter plates 41, 42 and the first and second slide portions 71, 72 having the first and second shutter plates 41, 42 mounted between the first position for closing the openings 31 and the second position for opening the openings 31. The guide mechanism 8 comprises a shutter contact and separation operating part 20 which makes the first and second shutter plates 41, 42 contact the shutter slide faces 5 in the first position, separates the first and second shutter plates 41, 42 from the shutter slide faces 5 during sliding from the first position to the second position, and makes the first and second shutter plates 41, 42 approach and contact the shutter slide faces 5 during sliding from the second position to the first position.

First, the general constitution of the guide mechanism 8 is explained, then, the shutter contact and separation operating part 20 is explained.

As shown in FIGS. 15A, 15B, 16A, and 16B, the guide mechanism 8 comprises a pair of first and second convex guides 11, 12 arranged in the facing portion of the inner surface of the slide-member assembling portion 37, a pair of third and fourth concave guides 13, 14 arranged in the lower part of the pair of first and second convex guides 11, 12, a pair of fifth and sixth concave guides 15, 16 arranged on the outer surface of the left and right leg portions of the first and second legs 76, 77 of the first and second slide portions 71, 72 and engaged with the pair of first and second convex guides 11, 12 when inserting the first and second legs 76, 77 into the slide-member assembling portion 37 of the shell 3, and a pair of seventh and eighth convex guides 17, 18 engaged with the pair of third and fourth concave guides 13, 14.

The first and third guides 11, 13 are arranged on the inner surface of the upper half 32. The second and forth guides 12, 14 are arranged on the inner surface of the lower half 33.

The fifth and seventh guides 15, 17 are arranged on the outer surface of one (right in FIG. 15) of the left and right leg portions of the first and second legs 76, 77, whereas the sixth and eighth guides 16, 18 are arranged on the outer surface of another leg portion (left in FIG. 15).

As shown in FIG. 13, the width of the first leg 76, i.e. a distance $D_1$ between the seventh and eighth guides 17, 18, is set smaller than the width of the second leg 77, i.e. a distance $D_2$ between the seventh and eighth guides 17, 18.

Next, assembling of the guide mechanism 8 or assembling of the slide member 7 to the slide-member assembling portion 37 of the shell 3 is explained.

Figure 14:
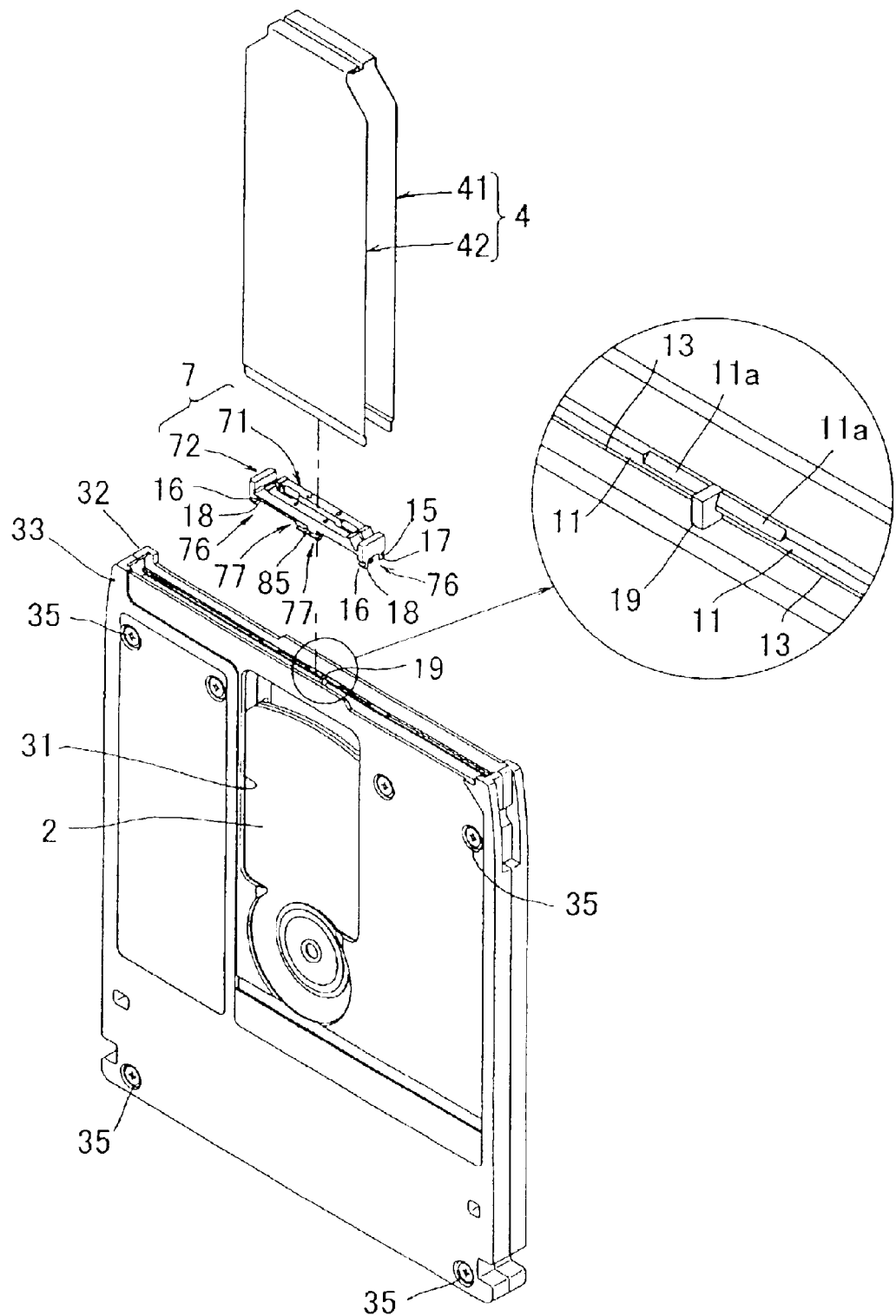
FIG. 14 is a perspective view of the shell in the assembled state.
Figure 15A:
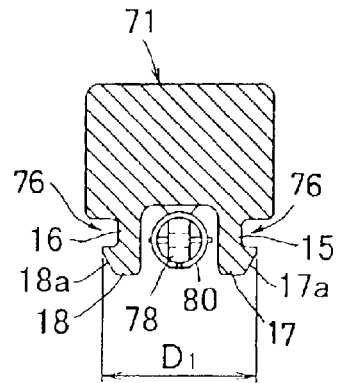
FIG. 15A is an assembling process drawing of a first leg.
Figure 15B:
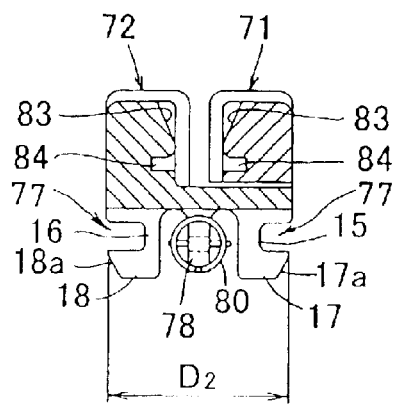
FIG. 15B is an assembling process drawing of a second leg.
Figure 16A:
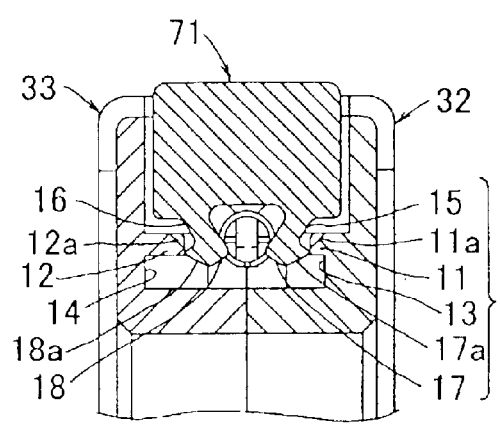
FIG. 16A is an assembling process drawing of the first leg.
Figure 16B:
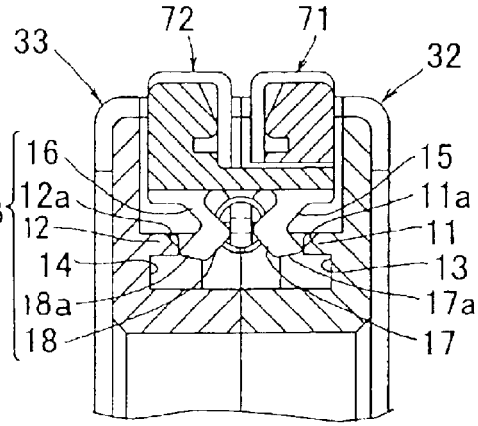
FIG. 16B is an assembling process drawing of the second leg.

With the first and second slide portions 71, 72 coupled by the spring member 80, the clearance 85 between the second legs 77, 77 of the first and second slide portions 71, 72 is aligned with the positioning projection 19 as shown in FIG. 14 to insert the first and second legs 76, 77 into the slide-member assembling portion 37 as shown in FIGS. 15A and 15B. When inserting the first and second legs 76, 77, the lower-end outside inclined faces 17a, 18a of the seventh and eighth guides 17, 18 abut on the inclined faces 11a, 12a of the first and second guides 11, 12 as shown in FIGS. 16A and 16B, producing inward elastic deformation of the left and right leg portions of the first and second legs 76, 77.

Figure 17A:
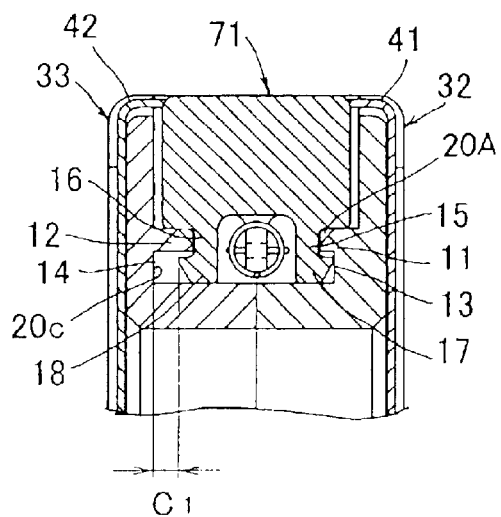
FIG. 17A is an assembling process drawing of the first leg.
Figure 17B:
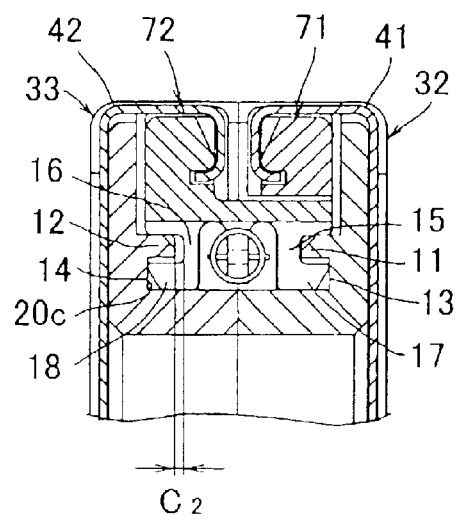
FIG. 17B is an assembling process drawing of the second leg.
Figure 18:
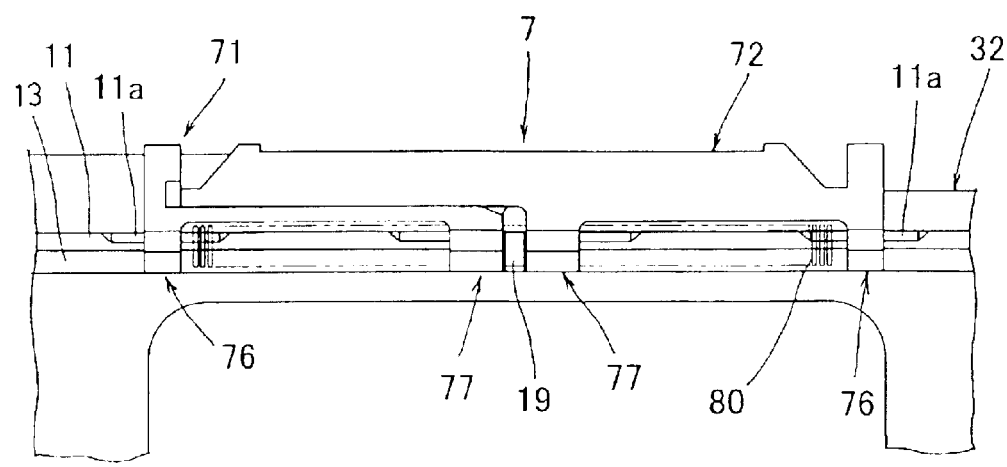
FIG. 18 is a plan view of a principal part with the slide member assembled.

When the sixth and eighth guides 16, 18 pass the first and second guides 11, 12, the left and right leg portions of the first and second legs 76, 77 return elastically, so that as shown in FIGS. 17A and 17B, the first to fourth guides 11–14 arranged on the inner surface of the slide-member assembling portion 37 of the shell 3 and the fifth to eighth guides 15–18 arranged on the outer surface of the first and second legs 76, 77 are engaged with each other by themselves. Then, as shown in FIG. 18, the positioning projection 19 arranged in the center of the first and second guides 11, 12 enters the clearance 85 between the second legs 77, 77 of the first and second slide portions 71, 72 to set the first and second slide portions 71, 72 to the second position for closing the openings 31 of the upper and lower halves 32, 33 through the first and second shutter plates 41, 42.

The first slide portion 71 is allowed by the positioning projection 19 to slide only in the direction to open and close the opening 31 of the upper half 32. The second slide portion 72 is allowed by the positioning projection 19 to slide only in the direction to open and close the opening 31 of the lower half 33.

Next, the shutter contact and separation operating part 20 is explained. As is described above, the shutter contact and separation operating part 20 makes the first and second shutter plates 41, 42 contact the shutter slide faces 5 in the first position, and separate the first and second shutter plates 41, 42 from the shutter slide faces 5 during sliding from the first position to the second position. Moreover, the shutter contact and separation operating part 20 makes the first and second shutter plates 41, 42 approach the shutter slide faces 5 during sliding from the second position to the first position, and makes the first and second shutter plates 41, 42 contact again the shutter slide faces 5 in the first position.

Figure 19A:
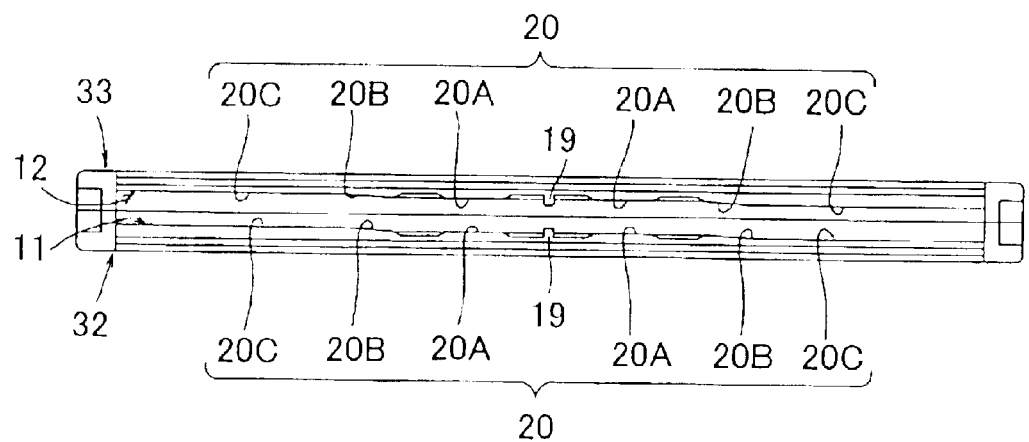
FIG. 19A is a front view of first and second guides.
Figure 19B:
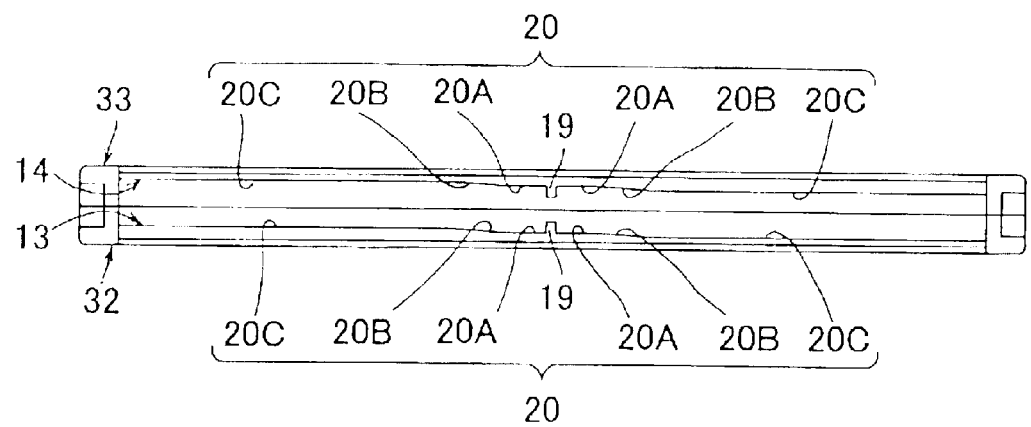
FIG. 19B is a front view of third and fourth guides.

The shutter contact and separation operating part 20 is arranged on the inner surface opposite to the first and second guides 11, 12 provided to the upper and lower halves 32, 33 as shown in FIG. 19A, and on the inner surface opposite to the third and fourth guides 13, 14 as shown in FIG. 19B. The shutter contact and separation operating part 20 is constructed by arranging a first flat face 20A for supporting the first slide portion 71 in the state that the first and second shutter plates 41, 42 contact the shutter slide faces 5 in the first position, an inclined face 20B for sliding the first slide member 71 in the direction to separate the first and second shutter plates 41, 42 from the shutter slide faces 5 during sliding from the first position to the second position, and a second flat face 20C for supporting the slide member in the state that the first and second shutter plates 41, 42 are separated from the shutter slide faces 5 in the second position.

The shutter contact and separation operating part 20 has an operating part for the first shutter plate 41 and that for the second shutter plate 42 disposed symmetrically with respect to the positioning projection 19.

Figure 20A:
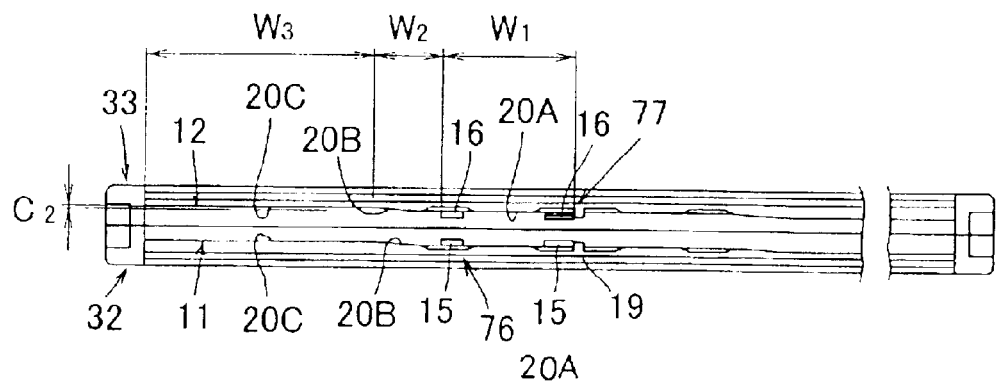
FIG. 20A is a front view showing the relationship between the first and second guides and the first and second legs in a first position.

As shown in FIG. 20A, the first flat face 20A arranged on the inner surface opposite to the first and second guides 11, 12 is formed on one side of the positioning projection 19 to have the width roughly equal to a width $W_1$ between the first and second legs 76, 77. The inclined face 20B is continuously formed with the first flat face 20A to have the width smaller than a width $W_2$ between the first and second legs 76, 77. And the second flat face 20C is continuously formed with one side of the inclined face 20B to have the width larger than a width $W_3$ which is larger than the width $W_2$ between the first and second legs 76, 77.

Figure 20B:
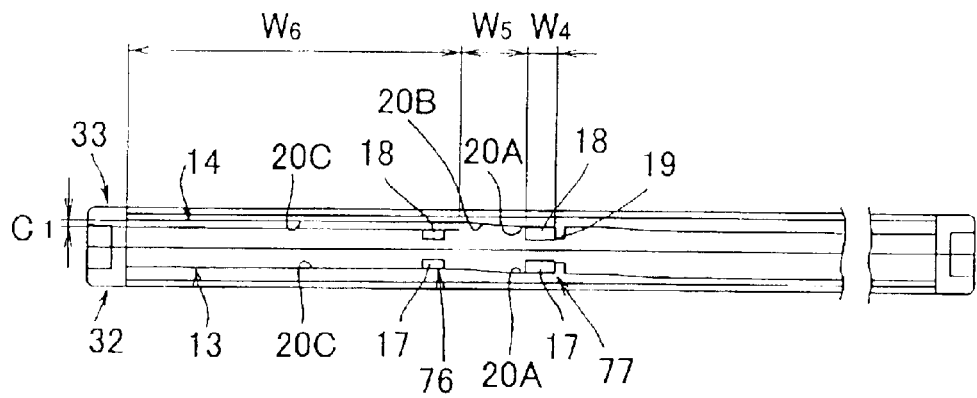
FIG. 20B is a front view showing the relationship between the third and fourth guides and the first and second legs in the first position.

As shown in FIG. 20B, the first flat face 20A arranged on the inner surface opposite to the third and fourth guides 13, 14 is formed on one side of the positioning project 19 to have a width $W_4$ roughly equal to the width of the second leg 77. The inclined face 20B is continuously formed with the first flat face 20A to have a width $W_5$ smaller than the width $W_2$ between the first and second legs 76, 77. And the second flat face 20C is continuously formed with one side of the inclined face 20B to have a width W6 larger than the width W2 between the first and second legs 76, 77.

Next, taking the second slide portion 72 as an example, operation of the shutter contact and separation operating part 20 is explained as to I) when the slide portion is located in the first position, II) when the slide portion is slid from the first position to the second position by a predetermined amount, and III) when the slide portion is slid to the second position.

I) When the Second Slide Portion 72 is Located in the First Position

As shown in FIGS. 17A and 20A, the fifth guide 15 of the first leg 76 is located in the first flat face 20A of the first guide 11 of the upper half 32 to abut thereon. The sixth guide 16 of the first leg 76 is located in the first flat face 20A of the second guide 12 of the lower half 33 to abut thereon. The fifth guide 15 of the second leg 77 is located in the first flat face 20a of the first guide 11 of the upper half 32 to abut thereon. The sixth guide 16 of the second leg 77 is located in the first flat face 20A of the second guide 12 of the lower half 33 to have a clearance $C_2$ of about 0.5 mm between the sixth guide 16 and the first flat face 20A.

On the other hand, as shown in FIGS. 17B and 20B, the seventh guide 17 of the first leg 76 is located in the second flat face 20C of the third guide 13 of the upper half 32 to abut thereon. The eighth guide 18 is located in the second flat face 20C of the fourth guide 14 of the lower half 33 to have a clearance $C_1$ of about 1.0 mm between the eighth guide 18 and the second flat face 20C. The seventh guide 17 of the second leg 77 is located in the first flat face 20A of the third guide 13 of the upper half 32 to abut thereon. The eighth guide 18 of the second leg 77 is located in the first flat face 20A of the third guide 13 of the upper half 32 to abut thereon.

In such a way, in the state parallel to the shutter slide face 5 of the lower shell 33, the second shutter plate 42 mounted to the second slide portion 72 abuts on the shutter slide face 5.

Figure 21:
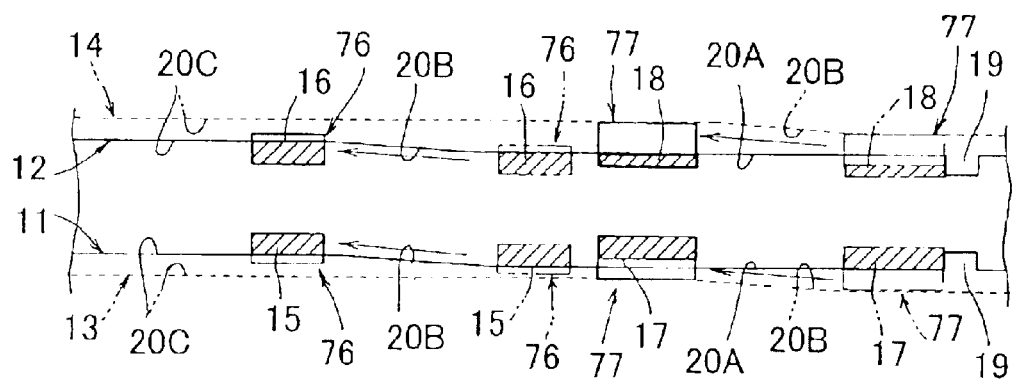
FIG. 21 is an explanatory view showing conditions that the first and second legs slide on slopes of different guides, respectively.

II) When Sliding from the First Position to the Second Position by a Predetermined Amount As shown in FIG. 21, the fifth guide 15 of the first leg 76 is slid to the second flat face 20C through the inclined face 20B of the first guide 11 of the upper half 32, whereas the sixth guide 16 of the second leg 77 is slid to the second flat face 20C through the inclined face 20B of the second guide 12 of the lower half 33.

On the other hand, the seventh guide 17 of the second leg 77 is slid to the second flat face 20C through the inclined face 20B of the third guide 13 of the upper half 32 as indicated by broken line, whereas the eighth guide 18 of the second leg 77 is slid to the second flat face 20C through the inclined face 20B of the fourth guide 14 of the lower half 33 as indicated by broken line.

Figure 22A:
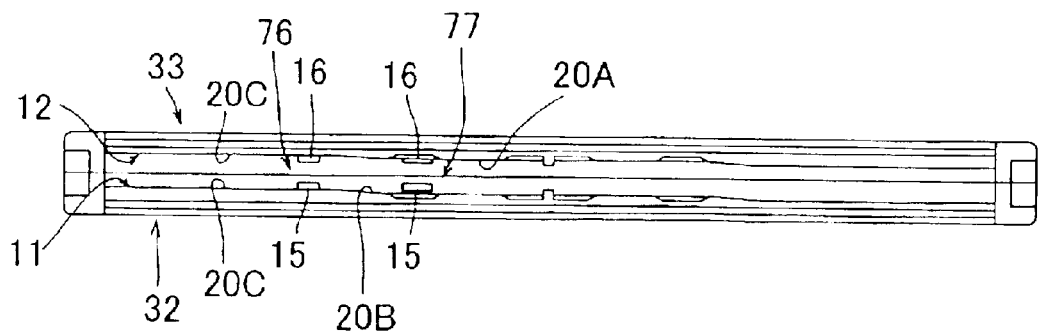
FIG. 22A is a front view showing the relationship between the first and second guides and the first and second legs in a middle position between the first position and the second position.
Figure 23A:
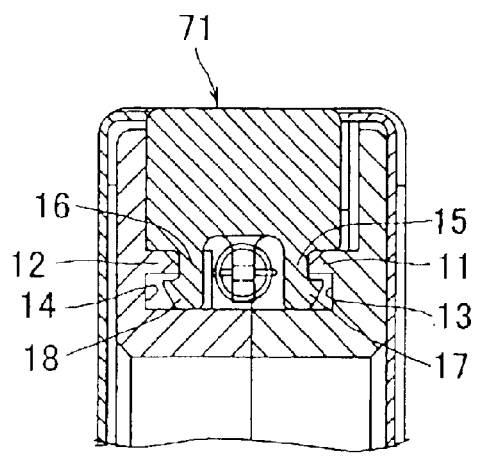
FIG. 23A is a longitudinal sectional view of the first leg.

As shown in FIGS. 22A and 23A, after passing the inclined face 20B of the first guide 11 of the upper half 32, the fifth guide 15 of the first leg 76 abuts on the second flat face 20C. The sixth guide 16 of the first leg 76 is located in the second flat face 20C of the lower half 33 to abut thereon. The fifth guide 15 of the second leg 77 is located in the inclined face 20B of the first guide 11 of the upper half 32 to be in non-contact therewith. The sixth guide 16 of the second leg 77 abuts on the first flat face 20A of the second guide 12 of the lower half 33.

Figure 22B:
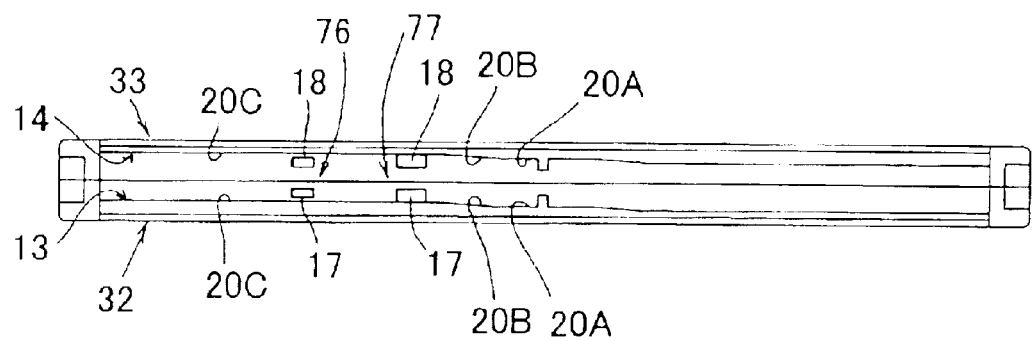
FIG. 22B is a front view showing the relationship between the third and fourth guides and the first and second legs in the middle position between the first position and the second position.
Figure 23B:
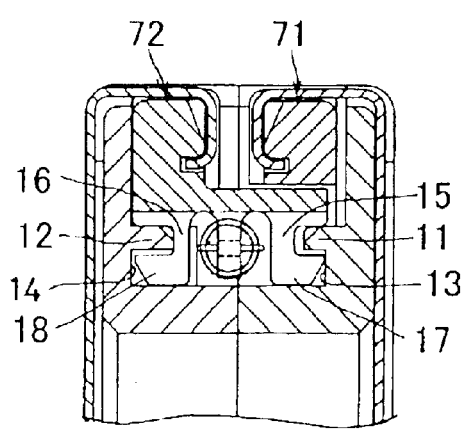
FIG. 23B is a longitudinal sectional view of the second leg.

On the other hand, as shown in FIGS. 22B and 23B, the seventh guide 17 of the second leg 77 is in non-contact with the second flat face 20C of the third guide 13 of the upper half 32. The eighth guide 18 of the first leg 76 is in non-contact with the second flat face 20C of the fourth guide 14 of the lower half 33. The seventh guide 17 of the second leg 77 abuts on the second flat face 20C of the third guide 13 of the upper half 32. The eighth guide 18 of the second leg 77 is located in the second flat face 20C of the fourth guide 14 of the lower half 33 to abut thereon.

III) When Sliding to the Second Position

Figure 24A:
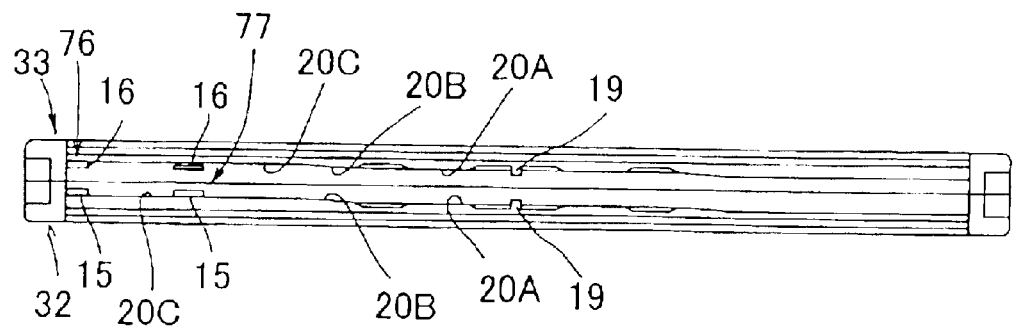
FIG. 24A is a front view showing the relationship between a shutter contact and separation operating part of the first and second guides and the first and second legs in the second position.
Figure 24B:
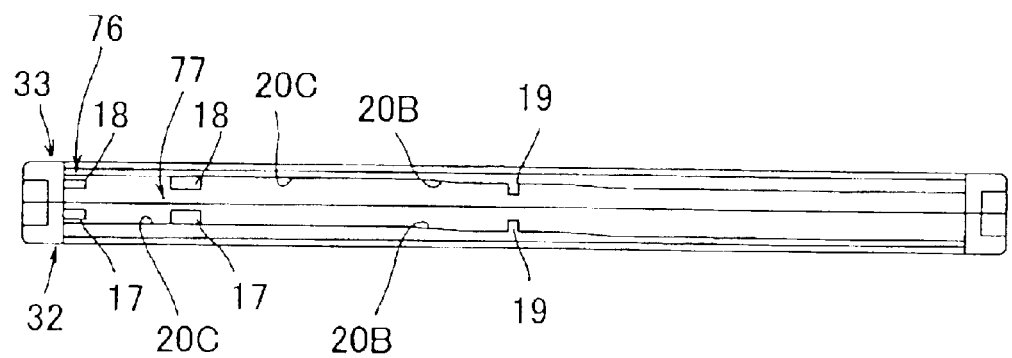
FIG. 24B is a front view showing the relationship between a shutter contact and separation operating part of the third and fourth guides and the first and second legs in the second position.
Figure 25A:
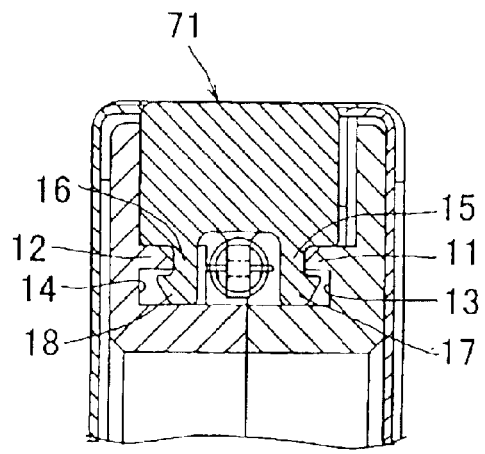
FIG. 25A is a longitudinal sectional view of the first leg in the second position.

As shown in FIGS. 24A and 25A, the fifth guide 15 of the first leg 76 abuts on the second flat face 20C of the first guide 11 of the upper half 32. The sixth guide 16 of the first leg 76 abuts on the second flat face 20C of the second guide 12 of the lower half 33. The fifth guide 15 of the second leg 77 is located in the second flat face 20C of the first guide 11 of the upper half 32 to abut thereon. The sixth guide 16 of the second leg 77 is located in the second flat face 20C of the second guide 12 of the lower half 33 to be in non-contact therewith.

Figure 25B:
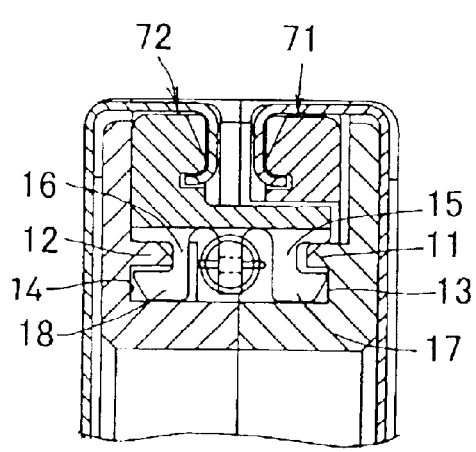
FIG. 25B is a longitudinal sectional view of the second leg in the second position.

On the other hand, as shown in FIGS. 25B and 25B, the seventh guide 17 of the first leg 76 is in non-contact with the second flat face 20C of the third guide 13 of the upper half 32. The eighth guide 18 of the first leg 76 is in non-contact with the second flat face 20C of the fourth guide 14 of the lower half 33. The seventh guide 17 of the second leg 77 abuts on the second flat face 20C of the third guide 13 of the upper half 32. The eighth guide 18 of the second leg 77 abuts on the second flat face 20C of the fourth guide 14 of the lower half 33.

In the embodiment, in order to slide the first and second shutter plates 41, 42 in parallel without being inclined with respect to the shutter slide faces 5 of the upper and lower halves 32, 33, the first and second legs 76, 77 of the first and second slide portions 71, 72 are inclined simultaneously through the inclined faces arranged on different guides. Optionally, when the first and second shutter plates 41, 42 can be inclined with respect to the shutter slide faces 5 of the upper and lower halves 32, 33, the first and second legs 76, 77 of the first and second slide portions 71, 72 may be inclined in a temporally different way through the inclined faces arranged on the same guide.

Figure 26:
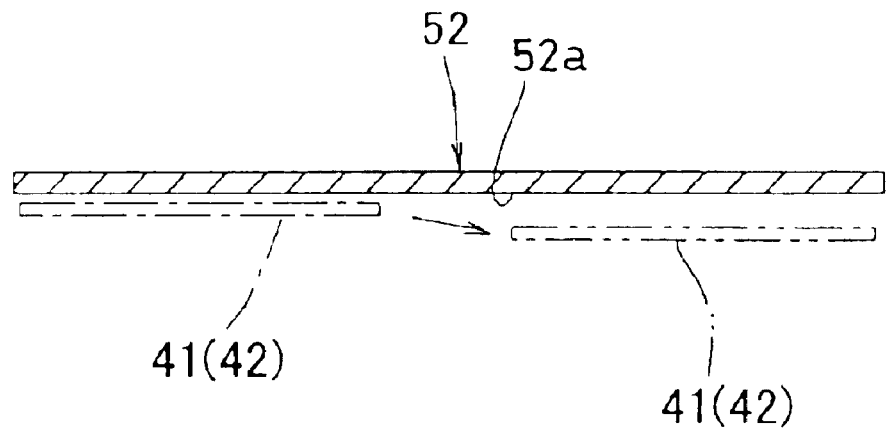
FIG. 26 is a sectional view of a slide guide plate.

As shown in FIGS. 1–4, an end of the first and second shutter plates 41, 42 is prevented by the slide guide plate 52 from being warped. As shown in FIG. 5, the slide guide plate 52 is formed like a plate having flat upper and lower faces and out of synthetic resin or the like. However, if the lower face (face which the first and second shutter plates 41, 42 contact) 52a of the slide guide plate 52 includes a flat face, an inconvenience occurs that the slide guide plate 52 cannot perform the function per se since, when the first and second shutter plates 41, 42 are slid from the second position (position for opening the opening of the shell) as indicated by one-dot chain line in FIG. 26 to the first position (position for opening the opening of the shell) as indicated by two-dot chain line, the first and second shutter plates 41, 42 are separated from the lower face 52a of the slide guide plate 52 to produce a clearance between the lower face 52a of the slide guide plate 52 and the first and second shutter plates 41, 42 in the second position.

Figure 27:
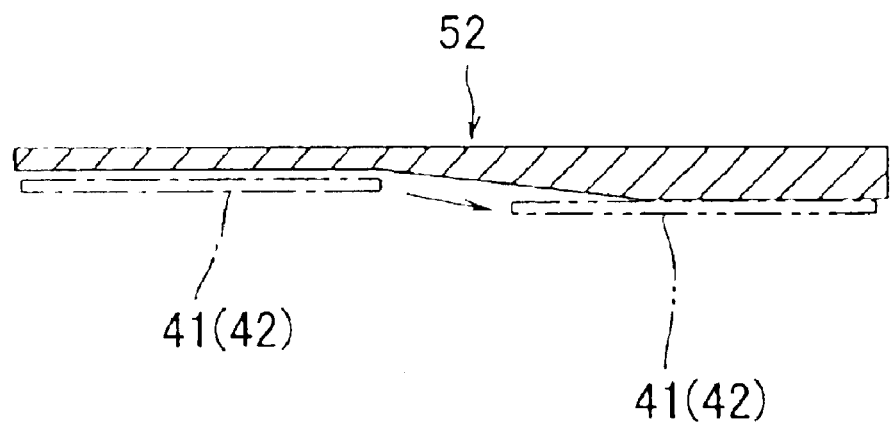
FIG. 27 is a sectional view of a variation of a slide guide plate.

Then, a step may be arranged on the lower face 52a of the slide guide plate 52 by changing the thickness of the slide guide plate 52 as shown in FIG. 27, for example, to make the first and second shutter plates 41, 42 contact the lower face 52a of the slide guide plate 52 in the first position as well, thus surely preventing an end of the first and second shutter plates 41, 42 from being warped.

In the embodiment, the shutter contact and separation operating part 20 is formed on the inner surface opposite to the first to fourth guides 11–14 which constitute the guide mechanism 8. Optionally, the shutter contact and separation operating part 20 may be formed separately from the first to fourth guides 11–14. Moreover, the guide mechanism 8 is not limited to that in the embodiment, and may include the structure which allows smooth sliding of the slide member. Further, in claim 1, providing the shutter contact and separation operating part 20 to the guide mechanism 8 means that the shutter is made to contact and separate from the shutter slide face of the shell during sliding through the guide mechanism 8. And even when the guide mechanism 8 and the shutter contact and separation operating part 20 appear to be formed separately, the structure which can make the shutter contact and separate from the shutter slide face of the shell during sliding through the guide mechanism 8 is included, of course, within the technical scope of the present invention.

7) Assembling Method of Shutter Plate to Slide Portion

Next, the assembling method of the first and second shutter plates 41, 42 to the first and second slide portions 71, 72 is explained.

Figure 28:
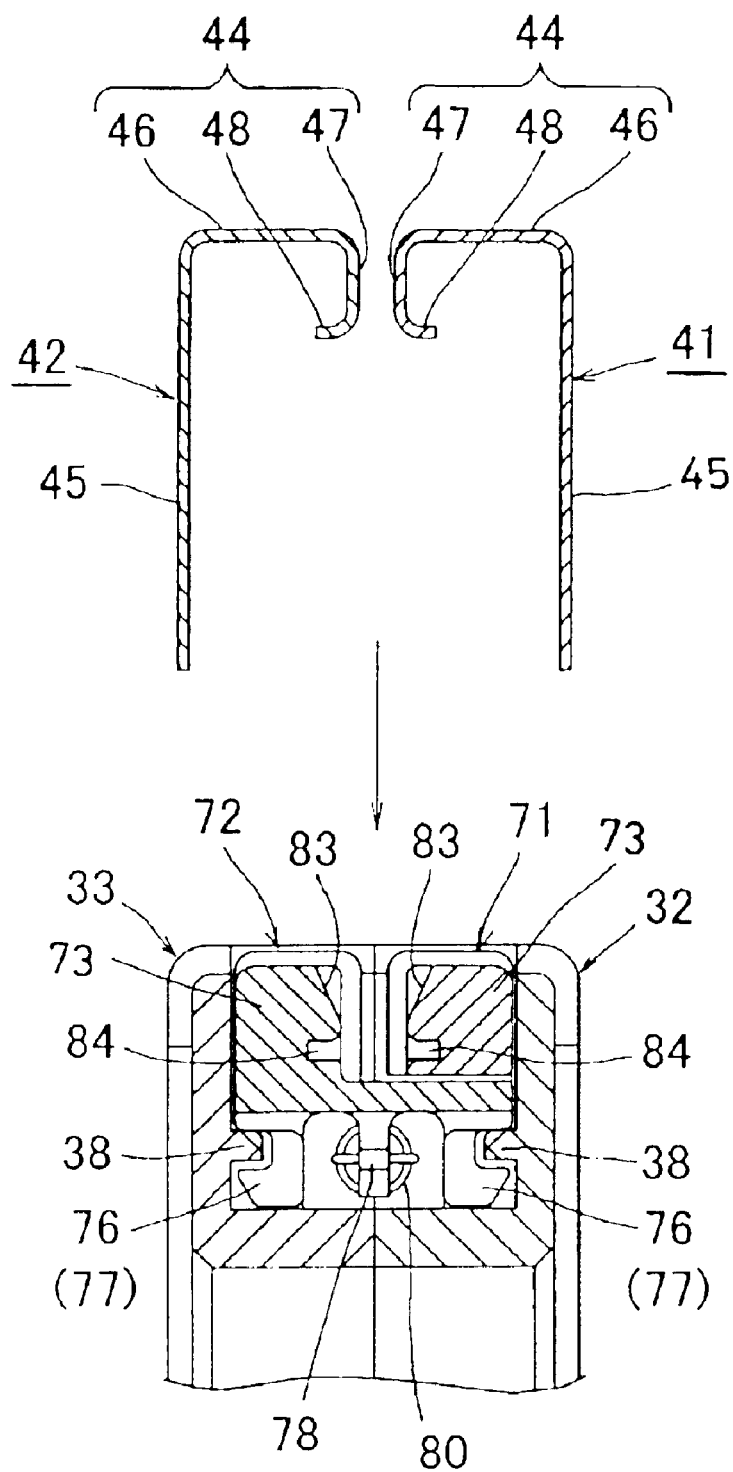
FIG. 28 is an assembling process drawing of the shutter.

As shown in FIG. 28, assembling of the first and second shutter plates 41, 42 to the first and second slide portions 71, 72 is carried out by assembling the first and second slide portions 71, 72 to the shell, then moving downward the slide-member mounting portion 44 from above to insert the shutter-plate mounting portion 73 of the first and second slide portions 71, 72 into the slide-member mounting portion 44.

Figure 29:
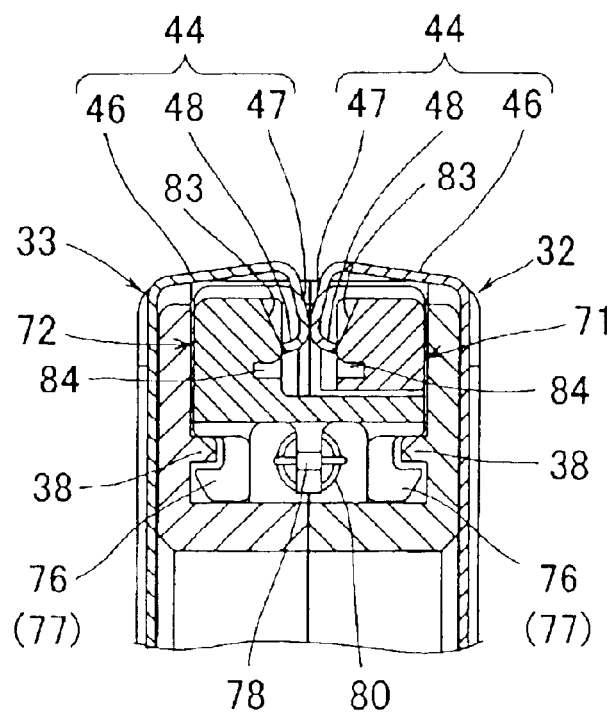
FIG. 29 is an assembling process drawing of the shutter.

When inserting the second bend 47 and engaging claw 48 of the slide-member mounting portion 44 of the first and second shutter plates 41, 42 between the first and second slide portions 71, 72, the engaging claw 48 of the slide-member mounting portion 44 abuts on the inclined face 83 as shown in FIG. 29, so that the engaging claw 48 and the second bend 47 are elastically deformed by the inclined face 83 in the direction to separate from the shutter main body 43, allowing further insertion of the first and second slide portions 71, 72.

When being inserted up to the position that the inner face of the first bend 46 of the first and second shutter plates 41, 42 abuts on a front-end face of the slide portions 71, 72, the engaging claw 48 is out of the position of the inclined face 83.

Figure 30:
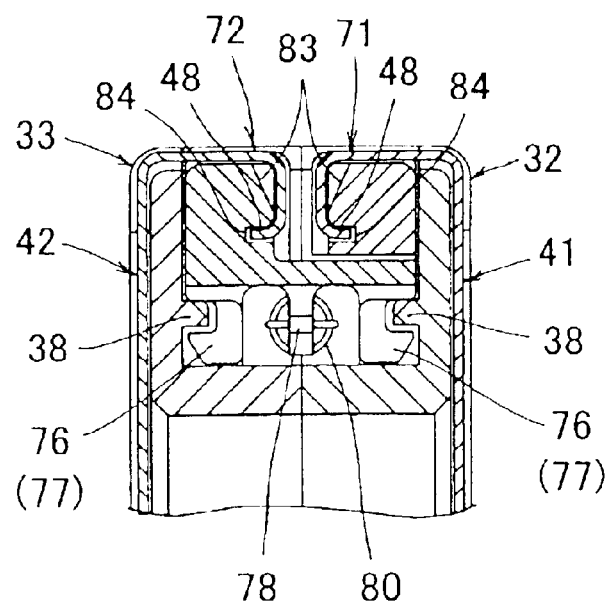
FIG. 30 is an assembling process drawing of the shutter.
Figure 31:
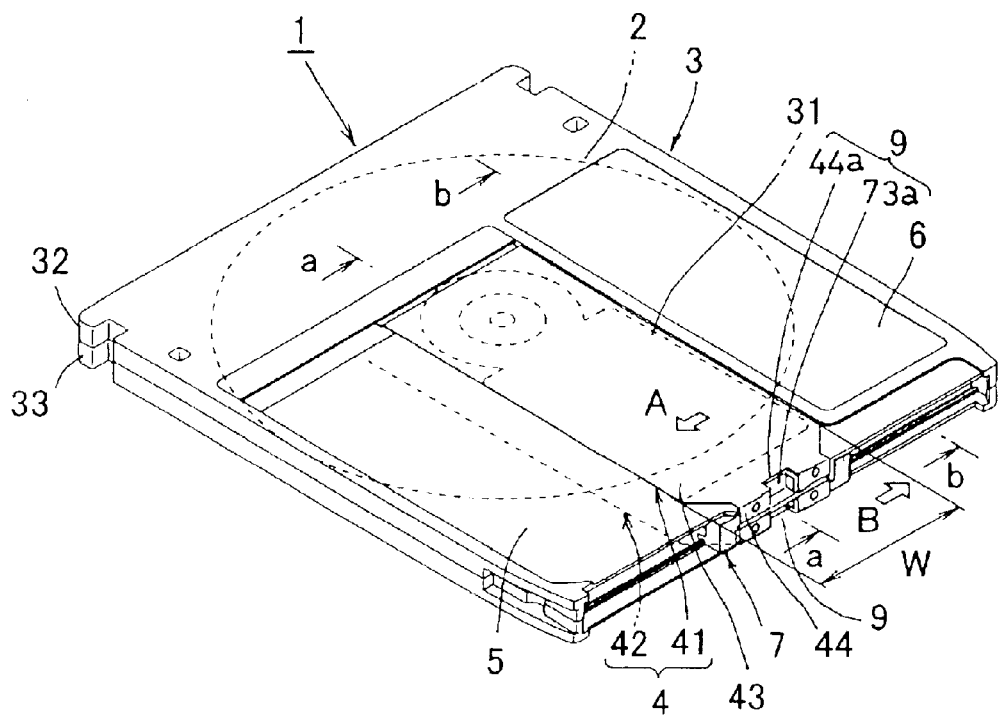
FIG. 31 is a perspective view of the cartridge in the second embodiment, seen from the right side (shutter closed condition)
Figure 32:
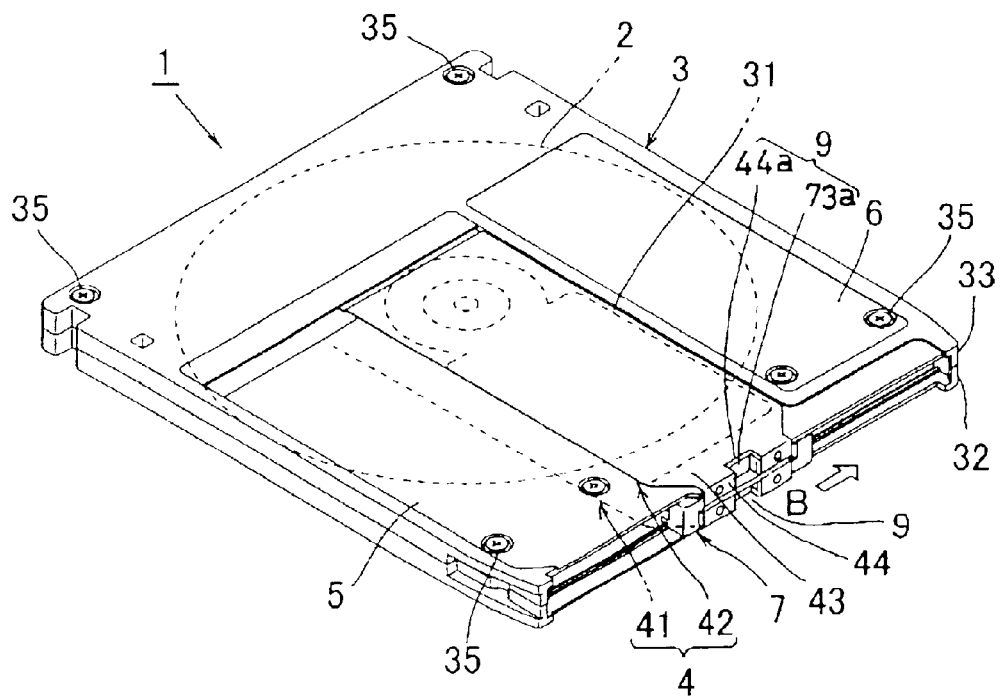
FIG. 32 is a perspective view of the cartridge in the second embodiment, seen from the reverse side (shutter closed condition)
Figure 33:
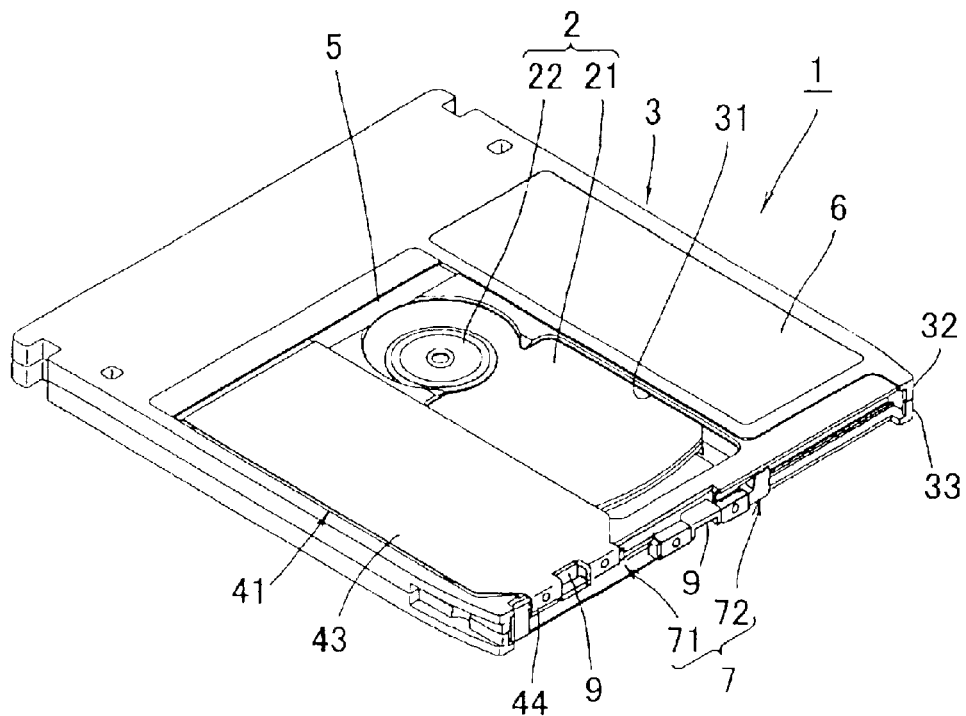
FIG. 33 is a perspective view of the cartridge in the second embodiment, seen from the right side (shutter open condition)
Figure 34:
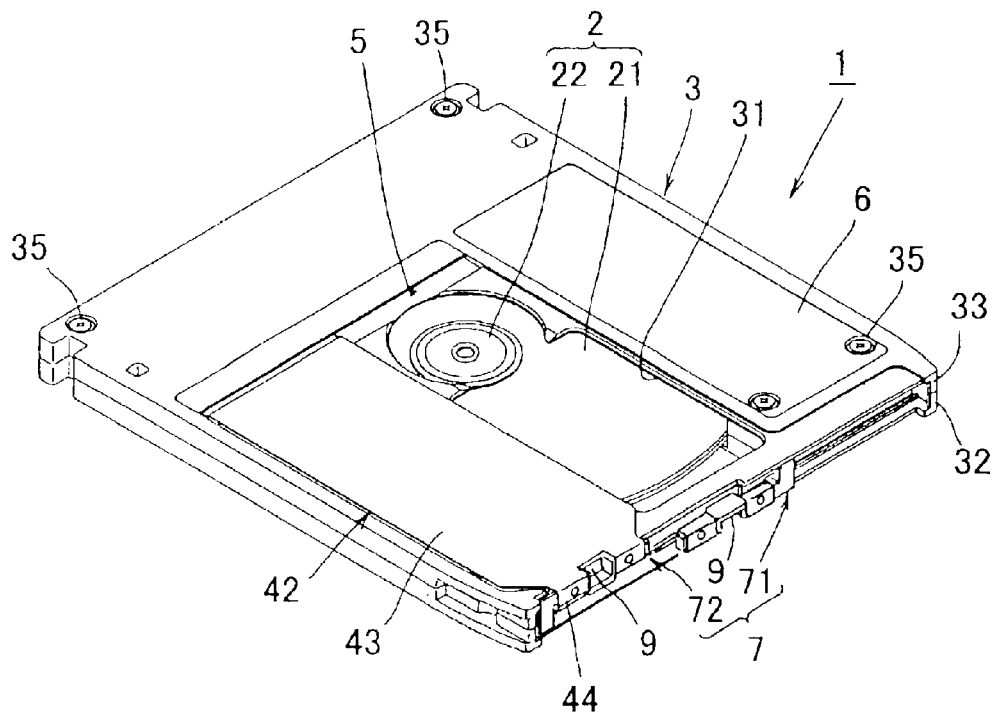
FIG. 34 is a perspective view of the cartridge in the second embodiment, seen from the reverse side (shutter open condition)

When the engaging claw 48 is out of the inclined face 83, the second bend 47 which was elastically deformed by being pressed by the inclined face 83 through the engaging claw 48 returns elastically to engage the engaging claw 48 with the claw engagement 84 as shown in FIG. 30, so that the first and second shutter plates 41, 42 become a state to be slidably mounted to the shell 3 through the first and second slide portions 71, 72.

8) Operation of Information Recording Medium Cartridge

When the first and second shutter plates 41, 42 are in the first position, they contact the shutter slide faces 5 of the upper and lower halves 32, 33 by the shutter contact and separation operating part 20 of the guide mechanism 8 to close the openings 31 arranged in the shutter slide faces 5.

When loading into the drive unit the cartridge 1 in the position with the upper half 32 up and the lower half 33 down (refer hereafter to as "normal position") as shown in FIG. 1, the shutter opening member provided to the drive unit is engaged with the shutter-opening-member engagement 75 of the second slide portion 72, so that the second slide portion 72 is slid in the direction of arrow B by the guide mechanism 8 to slide the second shutter plate 42 mounted to the second slide portion 72 to the second position for opening the opening 31 of the lower half 33 as the reverse side is seen in FIG. 3. At this time, since the second shutter plate 42 is separated from the shutter slide face 5 of the lower half 33 by the shutter contact and separation operating part 20 of the guide mechanism 8, the second shutter plate 42 is smoothly slid without producing friction to the shutter slide face 5.

After the second shutter plate 42 is slid to the first position, the center hub 22 of the disc 2 is chucked on the turntable 501 of the drive unit through the opening 31 of the lower half 33 for rotation as shown in FIG. 6, and recording and/or reproducing of the recording layer 24 of the first recording medium 26 of the disc 2 is carried out by the optical pickup 502.

When loading into the drive unit the cartridge 1 in the position with the lower half 33 up and the upper half 32 down (refer hereafter to as "reverse position") as shown in FIG. 2, the shutter opening member provided to the drive unit is engaged with the shutter-opening-member engagement 75 of the first slide portion 72, so that the first slide portion 71 is slid in the direction of arrow B by the guide mechanism 8 to slide the first shutter plate 41 mounted to the first slide portion 71 to the second position for opening the opening 31 of the upper half 32 as the reverse side is seen in FIG. 4. At this time as well, since the first shutter plate 41 is separated from the shutter slide face 5 of the upper half 32 by the shutter contact and separation operating part 20 of the guide mechanism 8, the first shutter plate 41 is smoothly slid without producing friction to the shutter slide face 5. After the first shutter plate 41 is slid to the first position, the center hub 22 of the disc 2 is chucked on the turntable 501 of the drive unit through the opening 31 of the upper half 32 for rotation, and recording and/or reproducing of the recording layer 24 of the first recording medium 26 of the disc 2 is carried out by the optical pickup 502.

When carrying out recording and/or reproducing in the normal position as well as recording and/or reproducing in the reverse position, another (upper) opening 31 which is not directly involved in recording and/or reproducing is maintained in the closed state, preventing dust or the like from entering the shell 3 through another opening 31 and adhering on the surface of the disc 2.

Since the slide directions of the first and second shutter plates 41, 42 are the same when sliding the first shutter plate 41 as shown in FIG. 3 from the first position to the second position and when sliding the second slide plate 42 as shown in FIG. 4 from the first position to the second position, the shutter opening member for opening the first shutter plate 41 can also serve as the shutter opening member for opening the second shutter plate 42.

10) Another Embodiment

FIGS. 31–38 show a second embodiment wherein the shutter-opening-member engagement 9 comprises shutter-side engagements 44a arranged in the center of the slide-member mounting portions 44 of the first and second shutter plates 41, 42, and slide-portion-side engagements 73a arranged in the center of the shutter-plate mounting portions 73 of the first and second slide portions 71, 72.

The shutter-side engagement 44a is formed by recessing the center of the slide-member mounting portion 44 of the first and second shutter plates 41, 42.

The slide-portion-side engagement 73a is formed in a bottomed shape with a bottom 73f.

Figure 36:
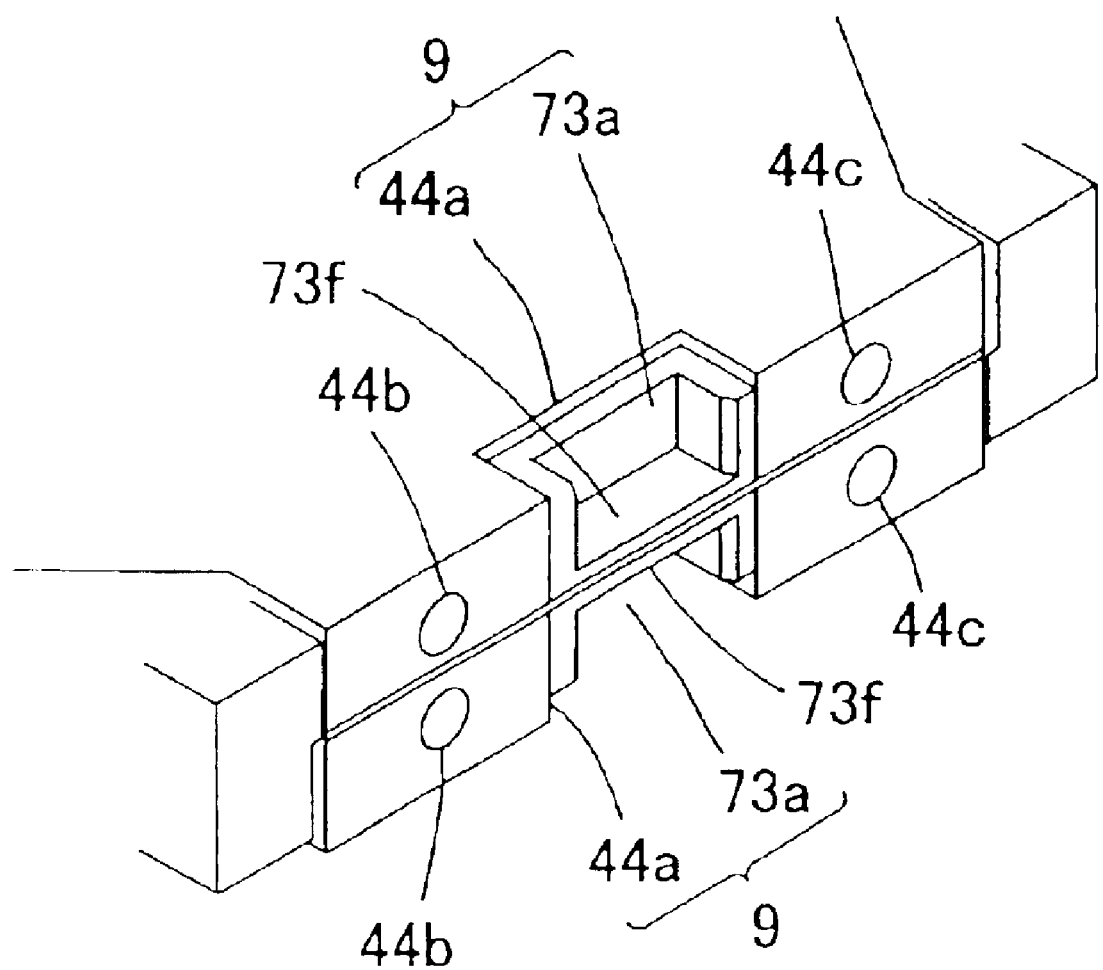
FIG. 36 is a perspective view of a principal part of the cartridge in the second embodiment.

As shown in FIG. 36, the shutter-side engagement 44a is slightly larger than the slide-portion-side engagement 73a, i.e. the slide-portion-side engagement 73a is slightly smaller than the shutter-side engagement 44a, so that the shutter engaging pin of the shutter opening member of the drive unit is engaged with only the slide-portion-side engagement 73a of the shutter-opening-member engagement 9.

The information recording medium cartridge in the second embodiment is constructed as described above, wherein when the first and second shutter plates 41, 42 are in the first position as shown in FIGS. 1 and 2, they close the openings 31 arranged in the shutter slide faces 5 of the upper and lower halves 32, 33.

Figure 37:
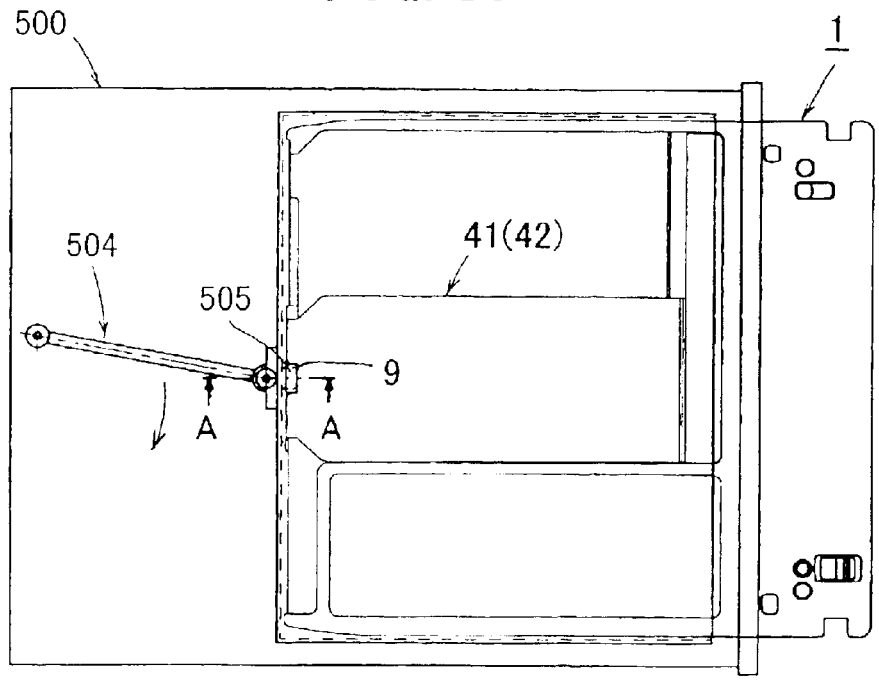
FIG. 37 is a plan view of a shutter opening member engaged with a shutter-opening-member engagement.
Figure 38:
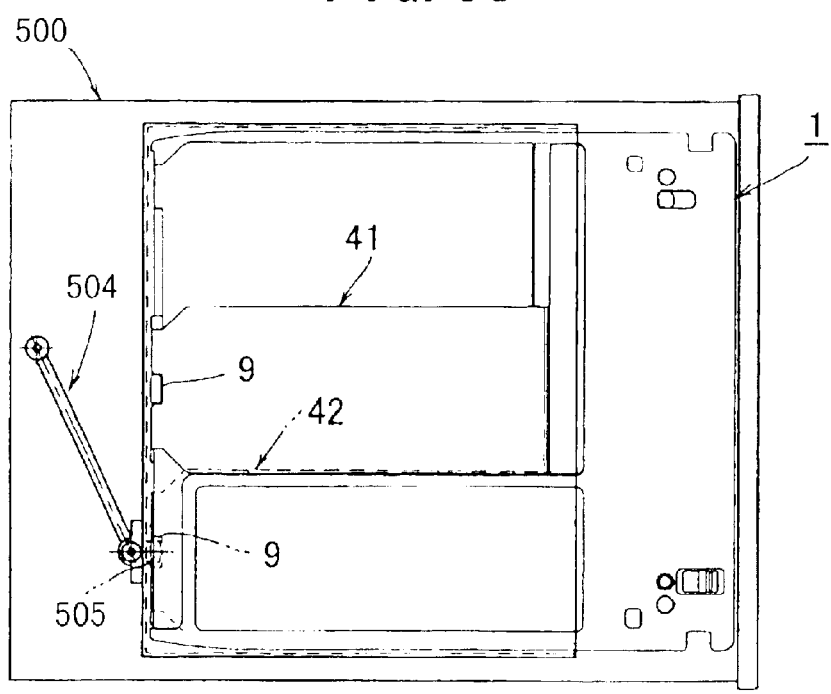
FIG. 38 is a plan view of a lower half side shutter opened by rotating the shutter opening member.

When loading into the drive unit 301 up to a predetermined position the cartridge 1 in the position with the upper half 32 up and the lower half 33 down (refer hereafter to as "normal position") as shown in FIG. 1, a shutter engagement 505 of a shutter opening member 504 provided to a drive unit 500 is engaged with the shutter-opening-member engagement 9 of the second slide portion 72, specifically, the slide-portion-side engagement 73a as shown in FIG. 37. Since the slide-portion-side engagement 73a of the second slide portion 72 and that of the first slide portion 72 located above are partitioned by the bottom 73f, the shutter engagement 505 of the shutter opening member 504 provided to the drive unit 500 is prevented from being engaged with the shutter-opening-member engagement 9 of the first slide portion 71. When loading the cartridge 1 into the drive unit 500, the shutter opening member 302 is rotated as shown in FIG. 38, so that the second slide portion 72 is slid in the direction of arrow B to slide the second shutter plate 42 mounted to the second slide portion 72 to the second position for opening the opening 31 of the lower half 33 as the reverse side is seen in FIG. 3.

After the second shutter plate 42 is slid to the first position, the center hub 22 of the disc 2 is chucked on the turntable of the drive unit 500 through the opening 31 of the lower half 33 for rotation, and recording and/or reproducing of the recording layer 24 of the first recording medium 26 of the disc 2 is carried out by the optical pickup.

When loading into the drive unit 500 the cartridge 1 in the position with the lower half 33 up and the upper half 32 down (refer hereafter to as "reverse position") as shown in FIG. 2, the shutter engaging pin 505 provided to the drive unit 500 is engaged with the slide-portion-side 73a of the shutter-opening-member engagement 9 of the first slide portion 72, so that the first slide portion 71 is slid in the direction of arrow B by the guide mechanism 8 to slide the first shutter plate 41 mounted to the first slide portion 71 to the second position for opening the opening 31 of the upper half 32 as the reverse side is seen in FIG. 4.

The information recording medium cartridge in the second embodiment is constructed as described above, wherein the shutter-opening-member engagement 9 with which the shutter opening member of the recording and/or reproducing device is engaged comprises shutter-side engagements 44a arranged in the center of the slide-member mounting portions 73 of the first and second slide portions 71, 72 and slide-portion-side engagements 73a arranged in the center of the shutter-plate mounting portions 73 of the first and second slide portions 71, 72, thus allowing smooth sliding of the first and second shutter plates.

Moreover, since the inner peripheral face of the shutter-side engagement 44a is disposed outside that of the slideportion-side engagement 73*a*, the shutter engaging pin 505 of the shutter opening member 504 contacts the inner peripheral face of the slide-portion-side engagement 73*a*, and is in non-contact with the inner peripheral face of the shutter-side engagement 44*a*, so that the shutter engaging pin 505 is protected from an edge and the like of the inner peripheral face of the shutter-side engagement 44*a*, whereas the inner peripheral face of the shutter-side engagement 44*a* is protected from deformation due to contact pressure and the like of the shutter engaging pin 505.

Figure 35:
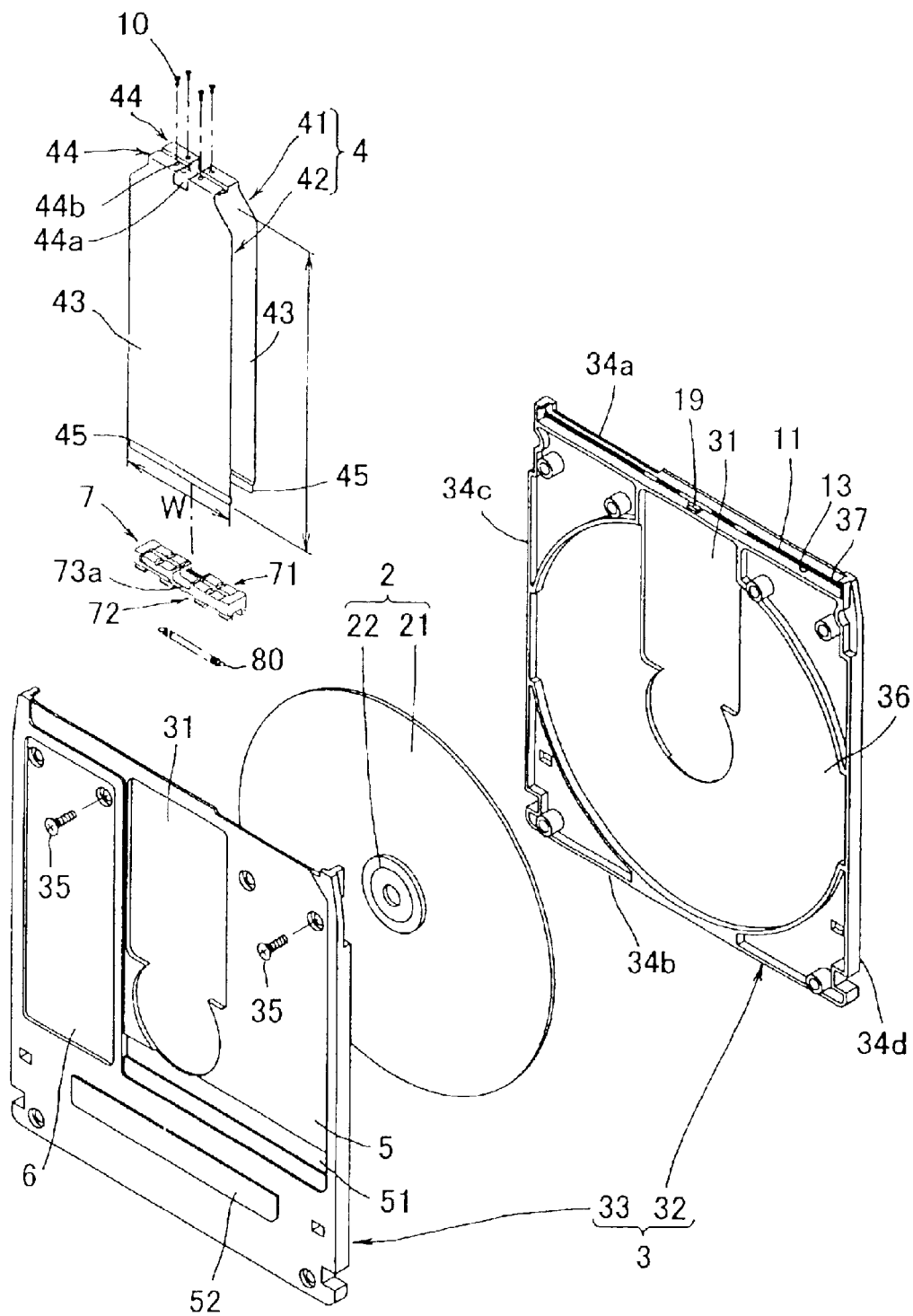
FIG. 35 is an exploded perspective view of the cartridge in the second embodiment.

As shown in FIG. 35, arranged on both side of the engagement 44*a* of the slide-member mounting portion 44 are screw receiving recesses 44*b*, 44*c* for introducing a head 10*a* of a screw 10 when screwing the both sides. A screw hole 44*d* is arranged in the center of the recesses 44*b*, 44*c*.

The other structures are substantially the same as those in the first embodiment, so that a redundant description is omitted.

Figure 39:
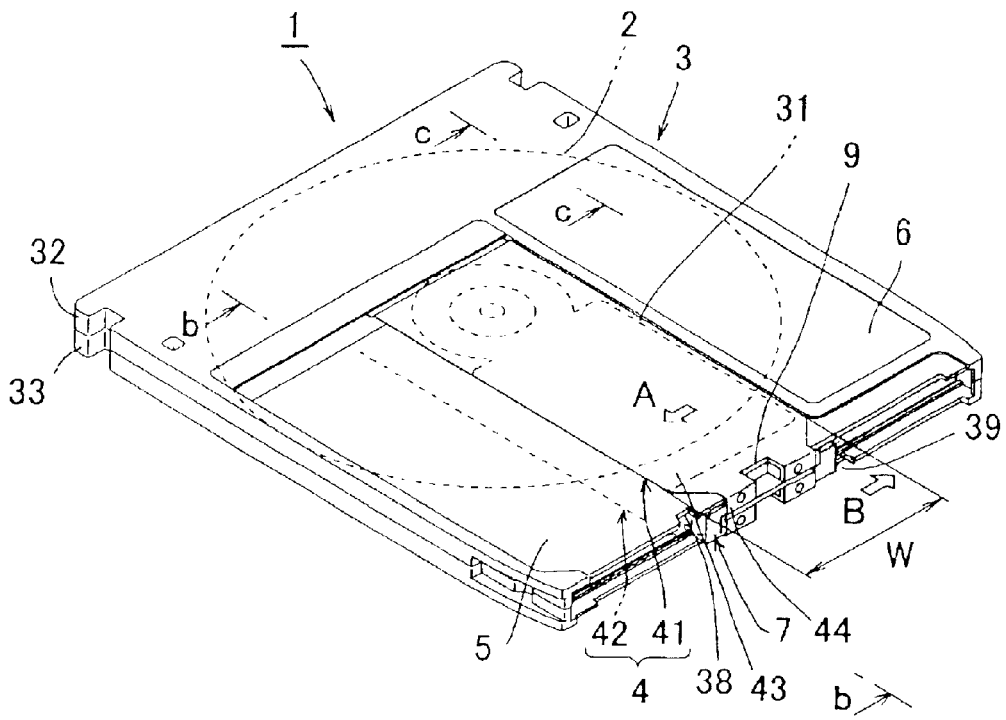
FIG. 39 is a perspective view of the cartridge in the third embodiment, seen from the right side (shutter closed condition)
Figure 40:
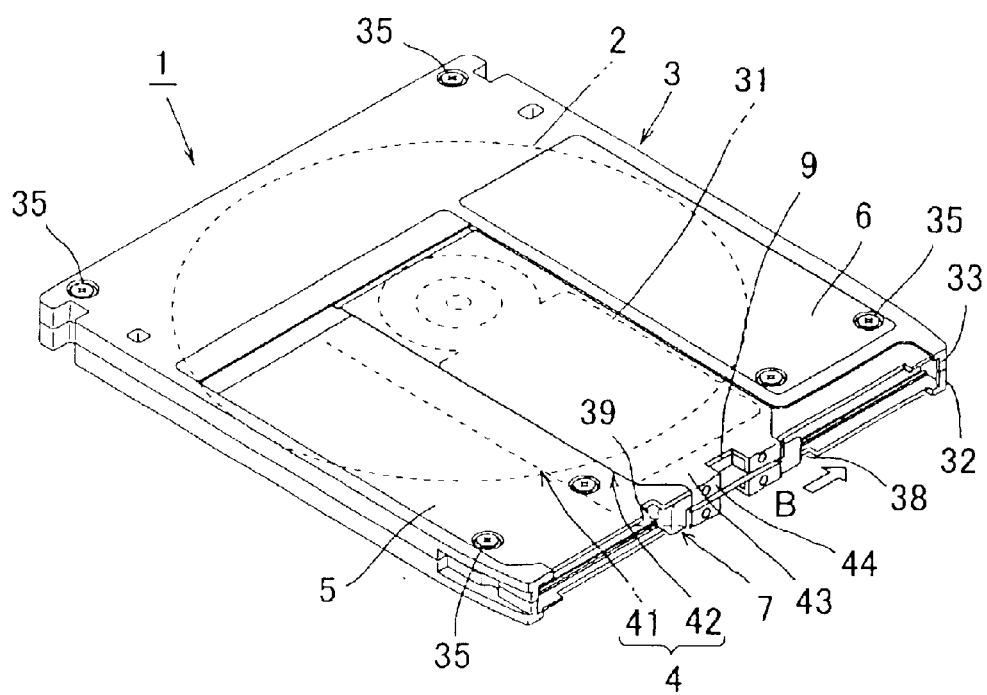
FIG. 40 is a perspective view of the cartridge in the third embodiment, seen from the reverse side (shutter closed condition)
Figure 41:
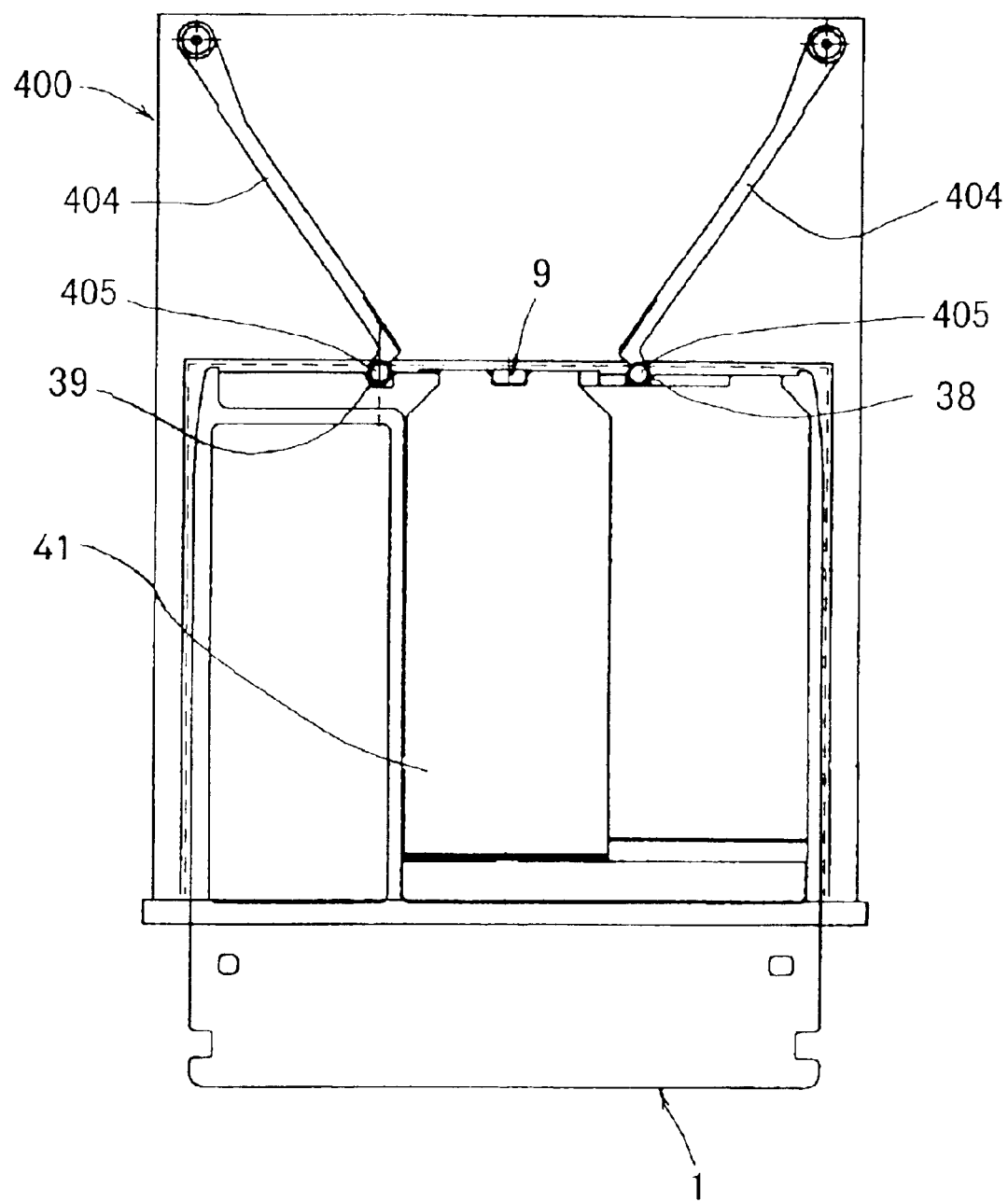
FIG. 41 is a plan view of the cartridge loaded into a drive unit.
Figure 42:
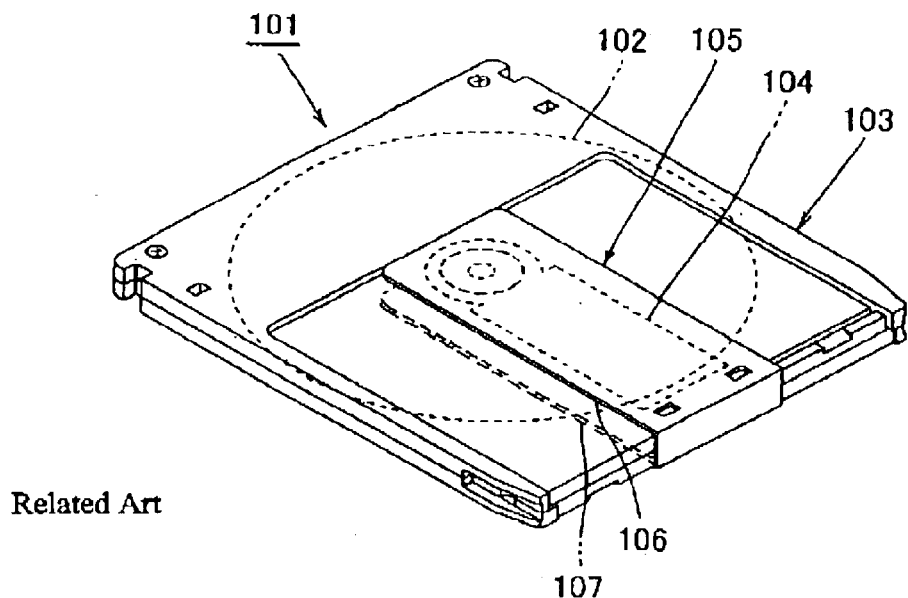
FIG. 42 is a perspective view of a conventional integrated-shutter type cartridge.
Figure 43:
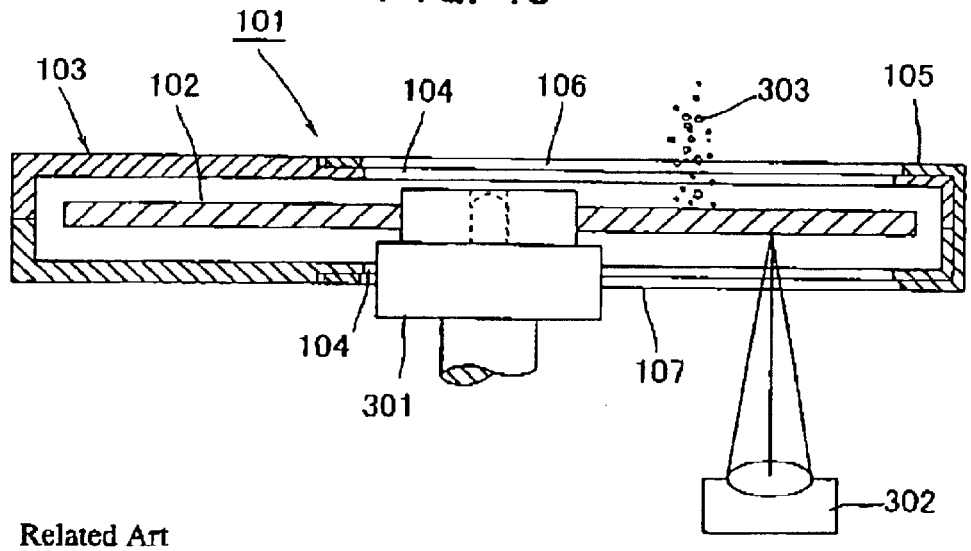
FIG. 43 is a sectional view of the conventional integrated-shutter type cartridge loaded into the drive unit.
Figure 44:
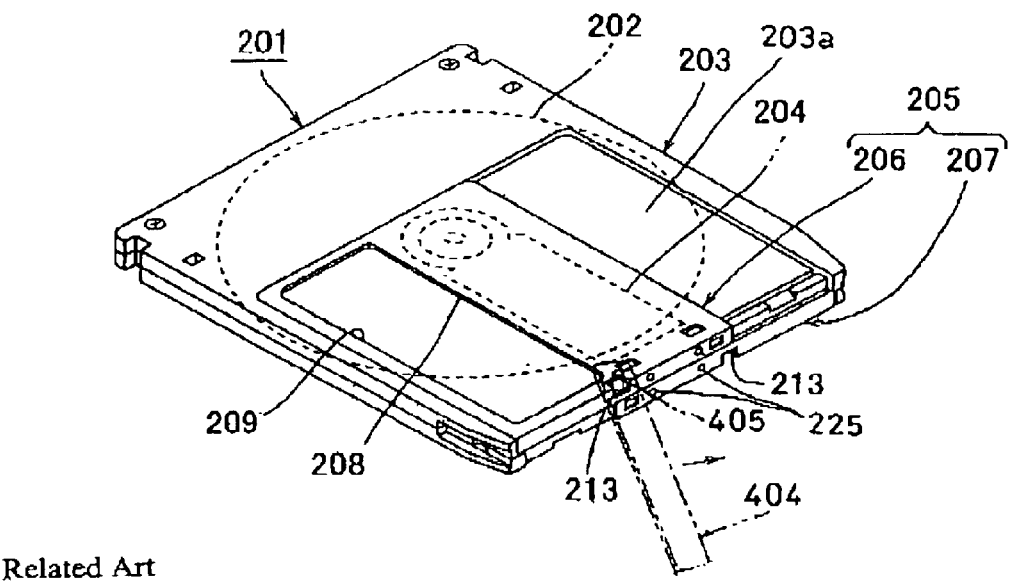
FIG. 44 is a perspective view of a conventional cartridge using a divided shutter.
Figure 45:
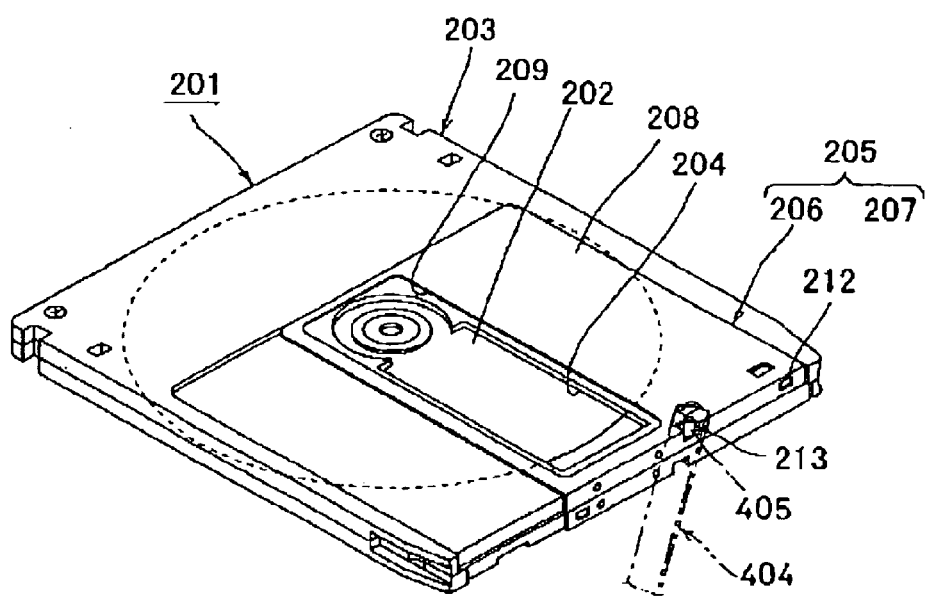
FIG. 45 is a perspective view of a conventional cartridge using a divided shutter, seen from the reverse side.
Figure 46:
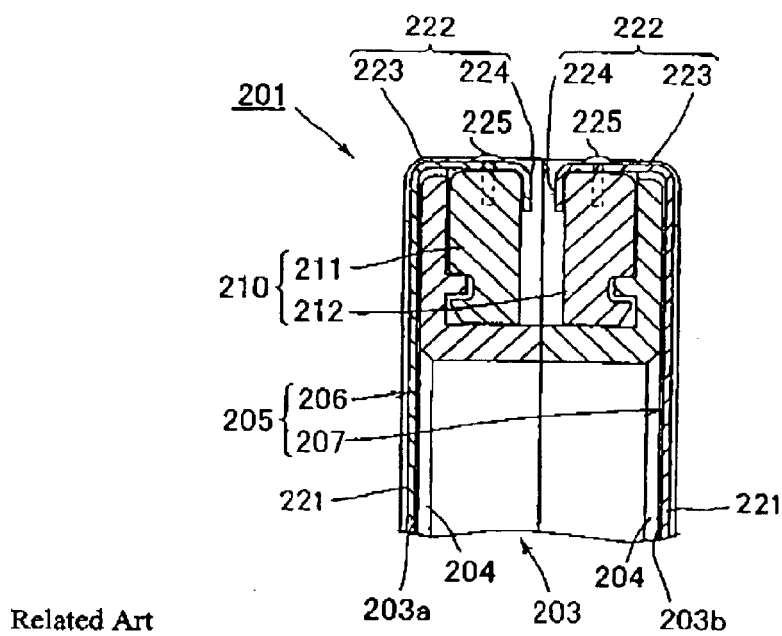
FIG. 46 is a sectional view of a principal part of the conventional cartridge using a divided shutter.
Figure 47:
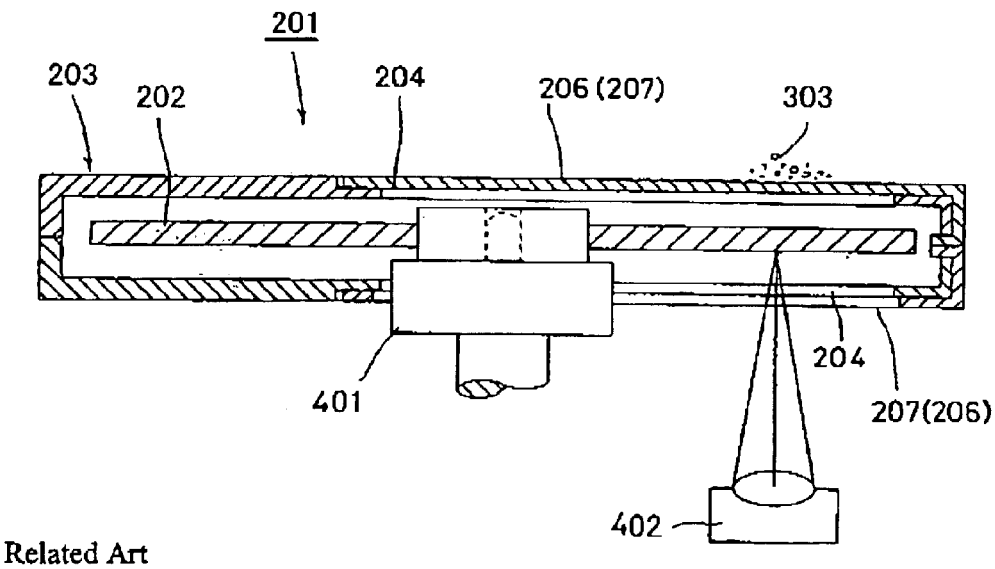
FIG. 47 is a sectional view of the cartridge loaded into the drive unit.
Figure 48:
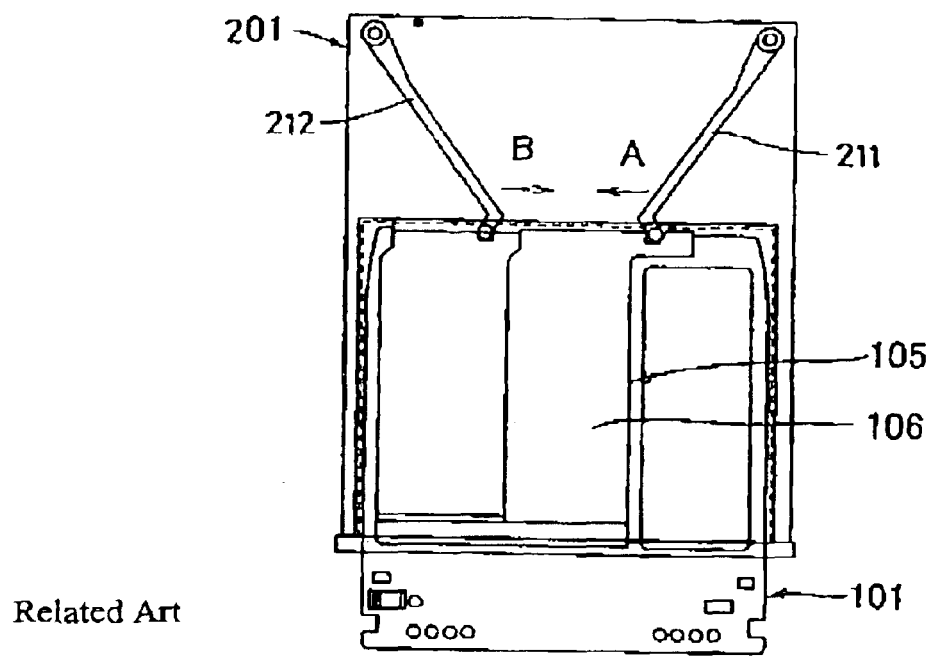
FIG. 48 is a plan view showing the relationship between the conventional integrated-shutter type cartridge and a first drive unit.
Figure 49:
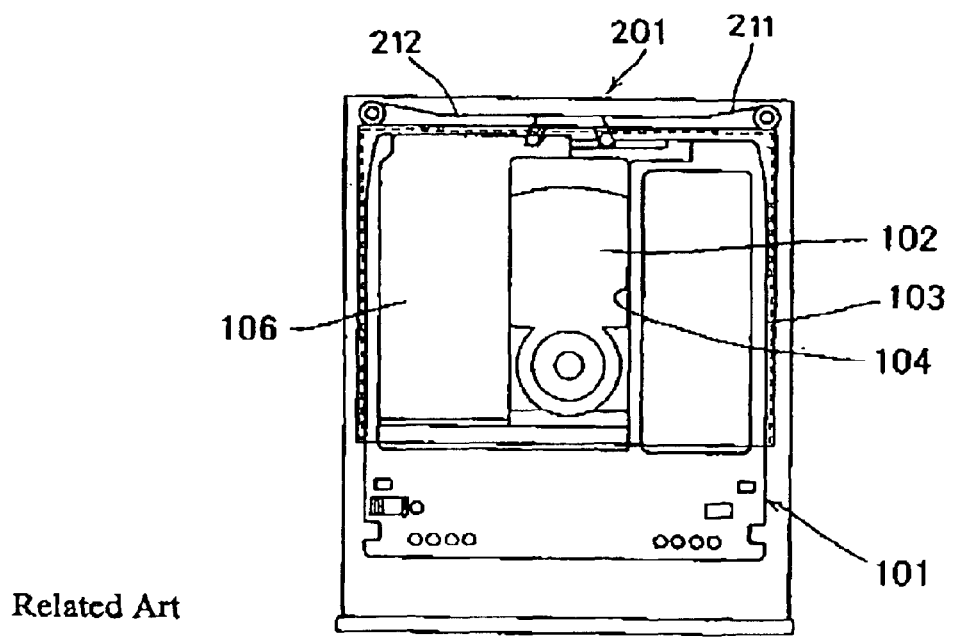
FIG. 49 is a plan view showing the relationship between the conventional integrated-shutter type cartridge and the first drive device.

FIGS. 39–41 show a third embodiment wherein it can be prevented that the information recording medium cartridge of the present invention is inserted by mistake into the drive unit for a conventional divided-shutter type cartridge which is different in recording and/or reproducing method.

With the divided-shutter type cartridges, the disc recording and/or reproducing method can be different between the divided-shutter type cartridge 1 of the present invention and the conventional divided-shutter type cartridge 201. In such a case and when the cartridge casing of the divided-shutter type cartridge 1 of the present invention and that of the conventional divided-shutter type cartridge 201 are manufactured having roughly the same size and shape, the divided-shutter type cartridge 1 of the present invention can be inserted by mistake into the drive unit for the conventional divided-shutter type cartridge 201.

If the divided-shutter type cartridge 1 of the present invention is loaded into the drive unit for the conventional divided-shutter type cartridge 201, the disc can be damaged due to difference in the disc recording and/or reproducing method.

In the third embodiment, full insertion of the information recording medium cartridge 1 of the divided-shutter type into the drive unit for the conventional divided-shutter type cartridge is made impossible, thus allowing solution of the conventional problem.

In this embodiment, as shown in FIGS. 39 and 40, first and second miss-insertion stops 38, 39 are arranged at a front end of the shell 3. The first miss-insertion stop 38 is provided to the upper half 32, and the second miss-insertion stop 39 is provided to the lower half 33.

When the divided-shutter type cartridge 1 of the present invention is inserted into a drive unit 400 for the conventional divided-shutter type cartridge 201 up to a predetermined position, shutter engaging pins 405 of the first and second shutter opening members 404, 404 of the drive unit 400 are engaged with the first and second miss-insertion stops 38, 39 arranged at the front end of the shell 3 of the cartridge 1, preventing loading into the drive unit 400.

The other structures are substantially the same as those in the first embodiment, so that a redundant description is omitted.

INDUSTRIAL APPLICABILITY

The present invention can widely be applied not only to optical disc cartridges, but also magnetic and magneto-optical disc cartridges such as CD, and the like.

What is claimed is:

1. An information recording medium cartridge provide with a disc information recording medium, a cartridge casing having the information recording medium accommodated therein, a shutter which opens and closes recording and/or reproducing openings arranged in right and reverse sides of the cartridge casing, a slide member having the shutter mounted thereto, and a guide mechanism which slidably mount the slide member to the cartridge casing so as to slide the shutter between a first position for closing the openings and a second position for opening the openings, characterized in that the guide mechanism is provided with a shutter contact and separation operating part, wherein during sliding from the first position to the second position, the shutter contact and separation operating part moves the shutter in a direction of separation with respect to a shutter slide face of the cartridge casing.

2. The information recording medium cartridge as specified in claim 1, characterized in that the guide mechanism comprises a cartridge-casing-side guide provided to the cartridge casing and a slid member-side guide provided to the slide member, wherein the cartridge-casing-side guide comprises a pair of convex guide portions provided in facing portions on an inner surface of a slide-member assembling portion of the cartridge casing, end wherein the slide-member-side guide comprises a pair of concave guide portions provided on an outer surface of a leg of the slide member assembled to the slide-member assembling portion of the cartridge casing, wherein when inserting the leg into the slide-member assembling portion of the cartridge casing, the pair of concave guide portions is engaged with the pair of convex guide portions.

3. The information recording medium cartridge as specified in claim 1, characterized in that the guide mechanism comprises a cartridge-casing-aide guide provided to the cartridge casing and a slide-member-side guide provided to the slide member, wherein the cartridge-casing-side guide comprises a pair of first and second convex guide portions provided in facing portions on an inner surface of a slide-member assembling portion of the cartridge casing and a pair of third and fourth concave guide portions arranged adjacent to the pair of first and second convex guide portions, and wherein the slide-member-side guide comprises a pair of fifth and sixth concave guide portions provided on an outer surface of a leg of the slide member assembled to the slide-member assembling portion of the cartridge casing wherein when inserting the leg into the slide-member assembling portion of the cartridge casing the pair of fifth and sixth concave guide portions is engaged with the pair of first and second convex guide portions, and a pair of seventh and eighth convex guide portions which is engaged with the pair of fifth and sixth convex guide portions.

4. The information recording medium cartridge as specified in claim 3, characterized in that the leg of the slide member comprises a first leg portion provided to the slide member at an end in a slide direction thereof and a second leg portion provided to the slide member in a center or another end in the slide direction.

5. The information recording medium cartridge as specified in claim 4, characterized in that the shutter contact and separation operating part is constructed by providing on facing surfaces of the first and second convex guide portions and opposite outer surfaces of the third and fourth concave guide portions a first flat surface for supporting the slide member with the shutter contacting the shutter slide face of the cartridge casing in the first position, an inclination surface for sliding the slide member in a direction to separate the shutter from the shutter slide face of the cartridge casing during sliding from the first position to the second position, and a second flat surface for supporting the slide member with the shutter separating from the shutter slide face of the cartridge casing in the second position.

6. The information recording medium cartridge as specified in claim 5, characterized in that the inclination surfaces of the first and second convex guide portions and those of the third and fourth concave guide portions are formed in positions with substantially the same spacing as that between the first leg portion and the second leg portion with respect to a slide direction of the slide member, wherein they operate the first leg position and the second leg portion simultaneously synchronously during sliding of the slide member to move the shutter while maintaining it parallel with respect to the shutter slide face of the cartridge casing.

7. An information recording medium cartridge provided with a shutter which opens and closes recording and/or reproducing openings arranged in right and reverse sides of the cartridge casing having an inflation recording medium accommodated therein, and a slide member which movably mounts the shutter to the cartridge casing in a direction to open and close the openings, wherein the shutter is divided into a first shutter plate for opening and closing the recording and/or reproducing opening arranged in one of the right and reverse sides of the cartridge casing and a second shutter plate for opening and closing the recording and/or reproducing opening arranged in another side of the cartridge casing, wherein the slide member is divided into a first slide portion to which the first shutter plate is mounted and a second slide portion to which the second shutter plate is mounted, wherein the first and second shutter plates are provided with a shutter main body which overlaps the right side or the reverse side of the cartridge casing to open and close the opening and a slide-member mounting portion arranged at an end of the shutter main body for mounting the first and second slide portions on an inner surface thereof and wherein the slide-member mounting portion is provided with a shutter-opening-member engagement with which a shutter opening member of the recording and/or reproducing device is engaged, characterized in that the shutter-opening-member engagement comprises a shutter-side engagement fanned by recessing the slide-member mounting portion of the shutter plate and a slide-member-side engagement formed by recessing the slide portion and facing the shutter-side engagement.

8. The information recording medium cartridge as specified in claim 7, characterized in that a recess of the shutter-side engagement is formed greater than a recess of the slide-member-side engagement, a recess edge of the slide-member-side engagement being exposed inside a recess edge of the shutter-side engagement.

9. The information recording medium cartridge as specified in claim 7, characterized in that the first and second shutter plates overlap one another in a direction of thickness of the cartridge casing when closing the recording and/or reproducing openings arranged in the right and reverse sides of the cartridge casing, and the shutter-opening-member engagements also overlap one another in a center of the cartridge casing.

10. The information recording medium cartridge as specified in claim 9, characterized in that at least one of the recesses of the slide-member-side engagements which constitute the shutter-opening-member engagements of the first and second shutter plates has a bottom, wherein when overlapping in the center of the cartridge casing, the shutter-opening-member engagements of the first and second shutter plates are separated by the bottom.

11. An information recording medium cartridge provided with a shutter which opens and closes recording mid/or reproducing openings arranged in right and reverse sides of the cartridge casing having an information recording medium accommodated therein, and a slide member which movably mounts the shutter to the cartridge casing in a direction to open and close the openings, wherein the shutter is divided into a first shutter plate for opening and closing the recording and/or reproducing opening arranged in one of the right and reverse sides of the cartridge casing and a second shutter plate for opening and closing the recording and/or reproducing opening arranged in another side of the cartridge casing, wherein the slide member is divided into a first slide portion to which the first shutter plate ma mounted and a second slide portion to which the second shutter plate is mounted, and wherein the first and second shutter plates are slid independently by the first and second slide portions, characterized in that the information recording medium cartridge is provided with shutter-opening-member engagements, wherein when inserted into a first recording and/or reproducing device, a shutter opening member provided to the first recording and/or reproducing device is engaged with the shutter-opening-member engagement which is pressed by the shutter opening member to slide the first and second shutter plates in a direction to open the openings, and miss-insertion stops, wherein when inserted into a second recording and/or reproducing device, the shutter opening member is engaged with the miss-insertion stop to stop further insertion of the cartridge by the shutter opening member.

12. The information recording medium cartridge as specified in claim 11, characterized in that the shutter-opening-member engagements are arranged in a center of the first and second slide portions.

13. The information recording medium cartridge as specified in claim 11, characterized in that the miss-insertion stops are arranged at a front end of the cartridge casing.

14. The information recording medium cartridge as specified in claim 13, characterized in that the miss-insertion stops are arranged in symmetric positions of the right and reverse sides of a front end of the cartridge casing with respect to a position of the opening-member engagement when closing the shutter.

* * * * *